(12) United States Patent
Abramov et al.

(10) Patent No.: US 12,097,948 B2
(45) Date of Patent: Sep. 24, 2024

(54) PROPULSION SYSTEM

(71) Applicant: Israel Aerospace Industries Ltd., Lod (IL)

(72) Inventors: Danny Abramov, Lod (IL); Shai Alexandroni, Lod (IL); Ben Keshales, Lod (IL)

(73) Assignee: Israel Aerospace Industries Ltd., Lod (IL)

( * ) Notice: Subject to any disclaimer, the term of this patent is extended or adjusted under 35 U.S.C. 154(b) by 0 days.

(21) Appl. No.: 18/596,947

(22) Filed: Mar. 6, 2024

(65) Prior Publication Data
US 2024/0208638 A1 Jun. 27, 2024

Related U.S. Application Data

(63) Continuation of application No. PCT/IL2022/050966, filed on Sep. 5, 2022.

(30) Foreign Application Priority Data

Sep. 9, 2021 (IL) .......................................... 286211

(51) Int. Cl.
*B64C 11/28* (2006.01)
*B64C 7/02* (2006.01)
*F01D 7/00* (2006.01)

(52) U.S. Cl.
CPC ................ *B64C 11/28* (2013.01); *B64C 7/02* (2013.01); *F01D 7/00* (2013.01)

(58) Field of Classification Search
CPC ..... B64C 29/00; B64C 29/0033; B64C 11/28; B64C 7/02; B64C 27/022; F01D 7/00
See application file for complete search history.

(56) References Cited

U.S. PATENT DOCUMENTS

| 3,592,412 A | 7/1971 | Glatfelter |
| 9,694,911 B2 | 7/2017 | Bevirt et al. |
| (Continued) | | |

FOREIGN PATENT DOCUMENTS

| CA | 2802389 A1 | 12/2011 |
| CN | 108202864 A | 6/2018 |
| (Continued) | | |

OTHER PUBLICATIONS

International Search Report and Written Opinion for International Application No. PCT/IL2022/050966 mailed Dec. 21, 2022.
(Continued)

*Primary Examiner* — Aaron R Eastman
(74) *Attorney, Agent, or Firm* — Dorsey & Whitney LLP

(57) ABSTRACT

A propulsion system, including a rotor arrangement rotatably mounted with respect to a nacelle about a rotor axis. The rotor arrangement includes rotor blades, each being pivotably mounted to a hub element about a respective blade pivot axis, the rotor blades being deployable between an undeployed configuration and a deployed configuration. The nacelle includes a nacelle body having a nacelle outer surface including facet elements and transition elements, each facet element extending aft from the hub element, each adjacent pair of facet elements being circumferentially spaced from one another by a corresponding transition element, each facet element having a first curvature with respect to the rotor axis, each transition element having a second curvature with respect to the rotor axis. The first curvature is different from the second curvature. In the undeployed configuration, each rotor blade is in overlying and fully external relationship with respect to a corresponding facet element.

30 Claims, 29 Drawing Sheets

(56) References Cited

U.S. PATENT DOCUMENTS

| | | | |
|---|---|---|---|
| 10,315,760 | B2 | 6/2019 | Bevirt et al. |
| 10,556,700 | B2 | 2/2020 | Bevirt et al. |
| 10,625,852 | B2 | 4/2020 | Bevirt et al. |
| 10,875,643 | B2 | 12/2020 | Bevirt et al. |
| 10,994,851 | B2 | 5/2021 | Bevirt et al. |
| 11,273,922 | B2 | 3/2022 | Bevirt et al. |
| 2016/0031556 | A1 | 2/2016 | Bevirt et al. |
| 2017/0240259 | A1* | 8/2017 | Shaw ................. C23F 13/18 |
| 2018/0079499 | A1* | 3/2018 | Foskey ................ B64C 11/28 |
| 2020/0180756 | A1* | 6/2020 | Kapeter .............. B64C 29/0033 |
| 2023/0406492 | A1* | 12/2023 | Beall .................. B64C 11/28 |
| 2024/0043133 | A1* | 2/2024 | Giannini ............. F01D 15/10 |

FOREIGN PATENT DOCUMENTS

| | | |
|---|---|---|
| CN | 112591083 A | 4/2021 |
| DE | 2854977 A1 | 7/1980 |
| DE | 3246635 A1 | 6/1984 |
| WO | 2015143093 A2 | 9/2015 |
| WO | 2020211028 A1 | 10/2020 |
| WO | 2023037361 A1 | 3/2023 |

OTHER PUBLICATIONS

Litherland, et al., "A Method for Designing Conforming Folding Propellers", American Institute of Aeronautics and Astronautics, Jun. 5, 2017, pp. 1-18.

Litherland, et al., "A Performance Analysis of Folding Conformal Propeller Blade Designs", Jun. 14, 2019, pp. 1-14.

Stoll, et al., "Drag Reduction Through Distributed Electric Propulsion", American Institute of Aeronautics and Astronautics, Jun. 13, 2014, pp. 1-10.

* cited by examiner

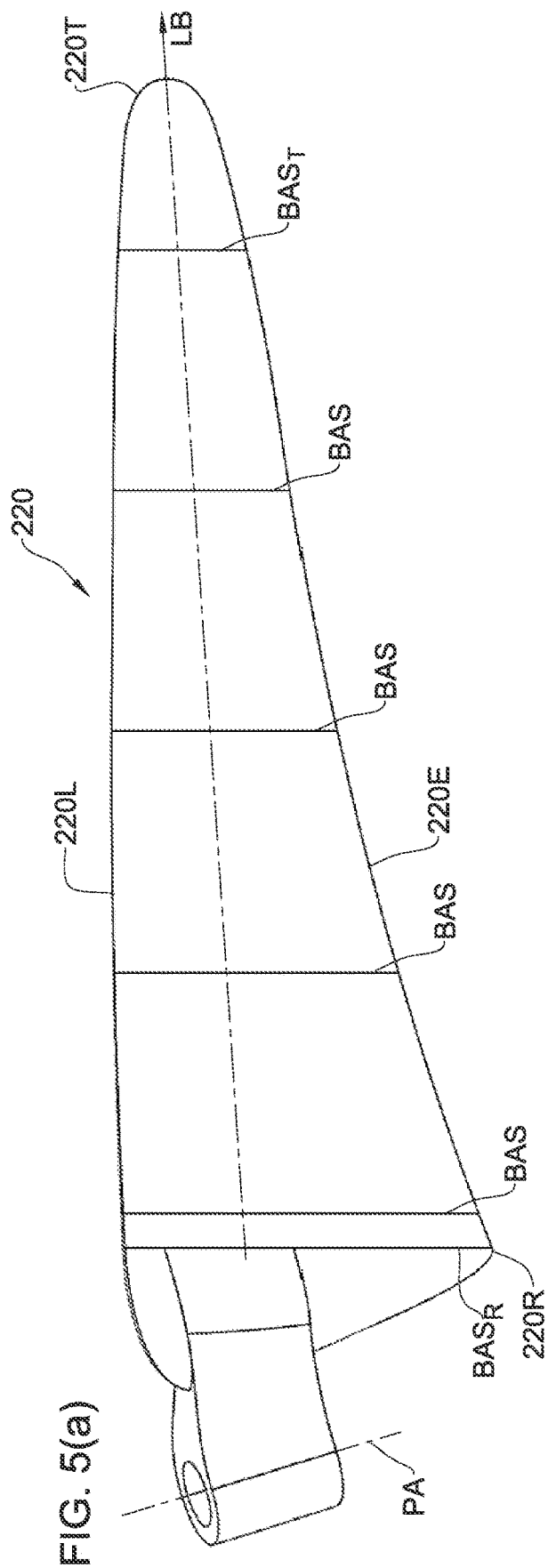
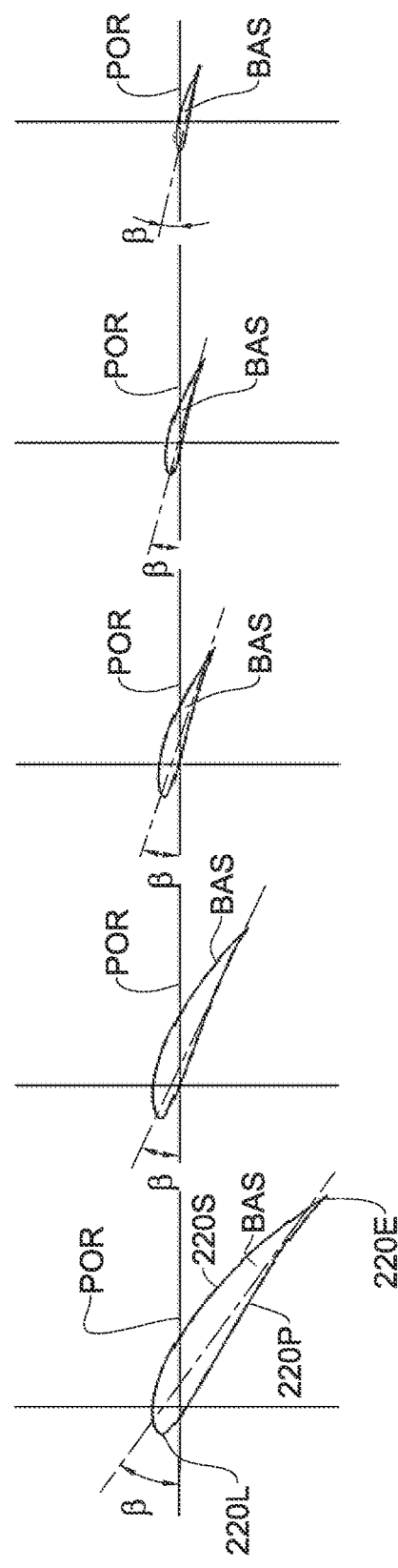
FIG. 5(a)
FIG. 5(b)

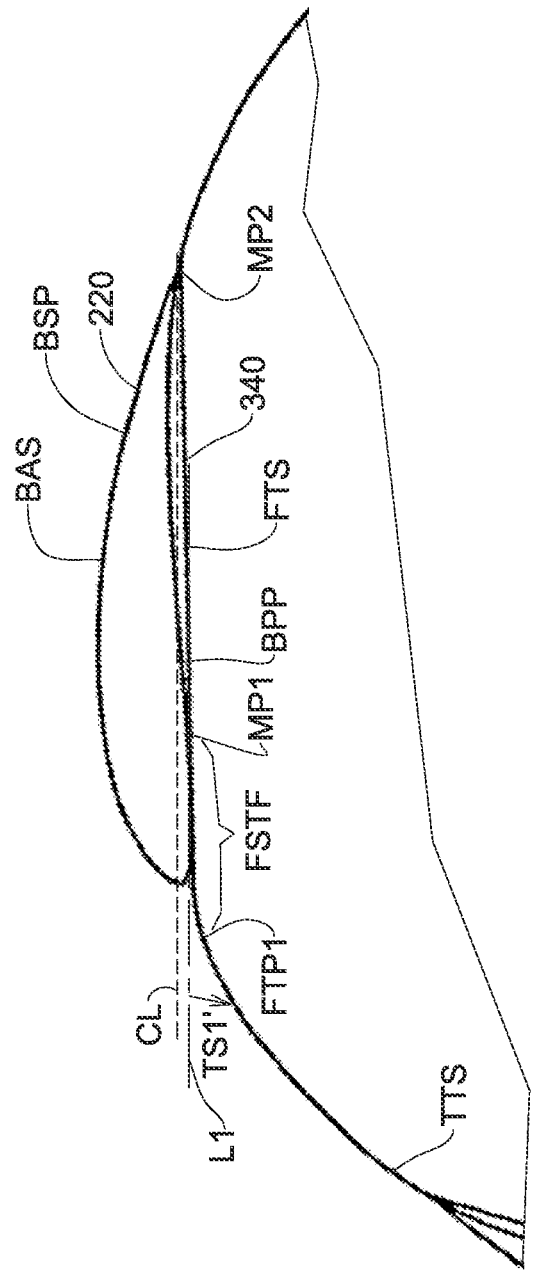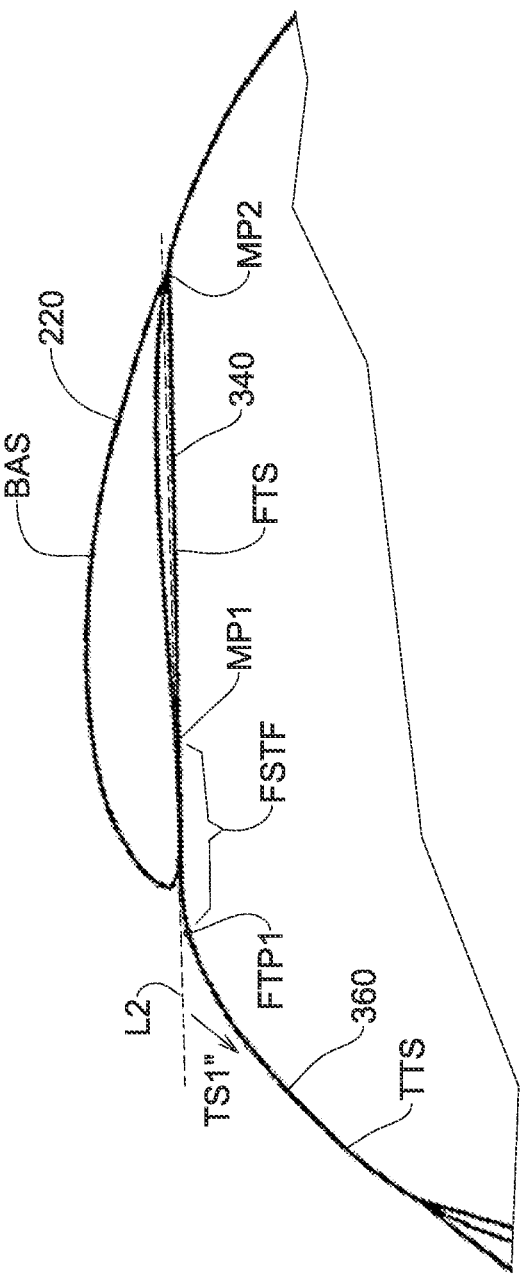
FIG. 9(a)
FIG. 9(b)

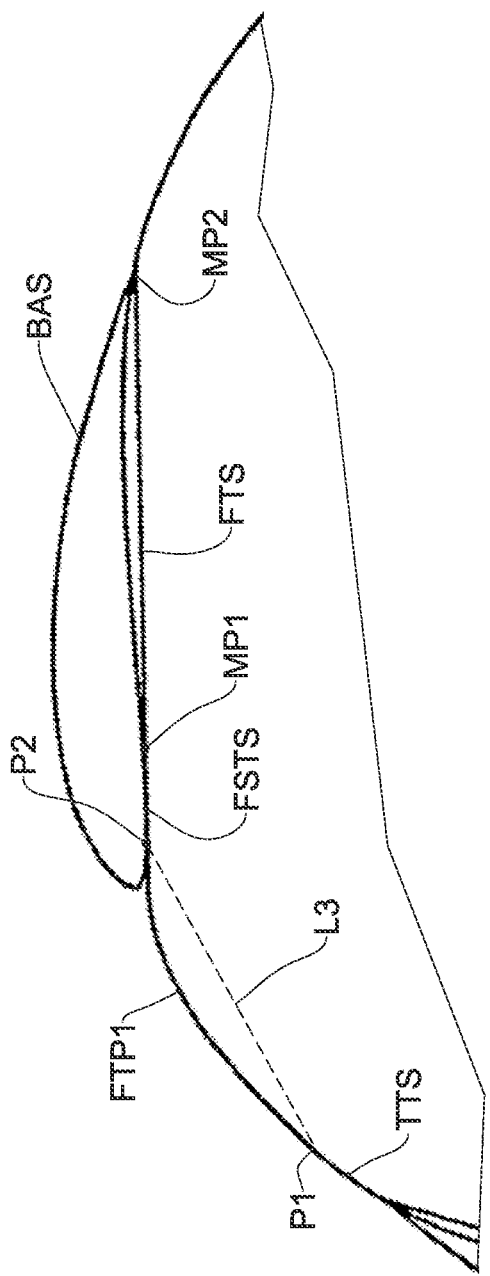
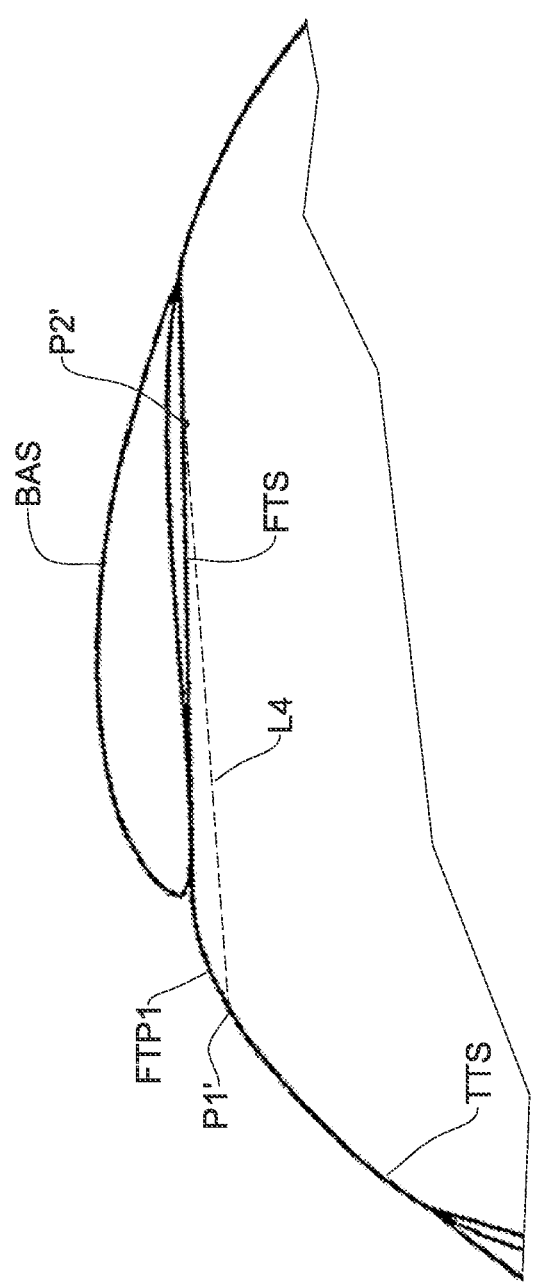
FIG. 9(c)
FIG. 9(d)

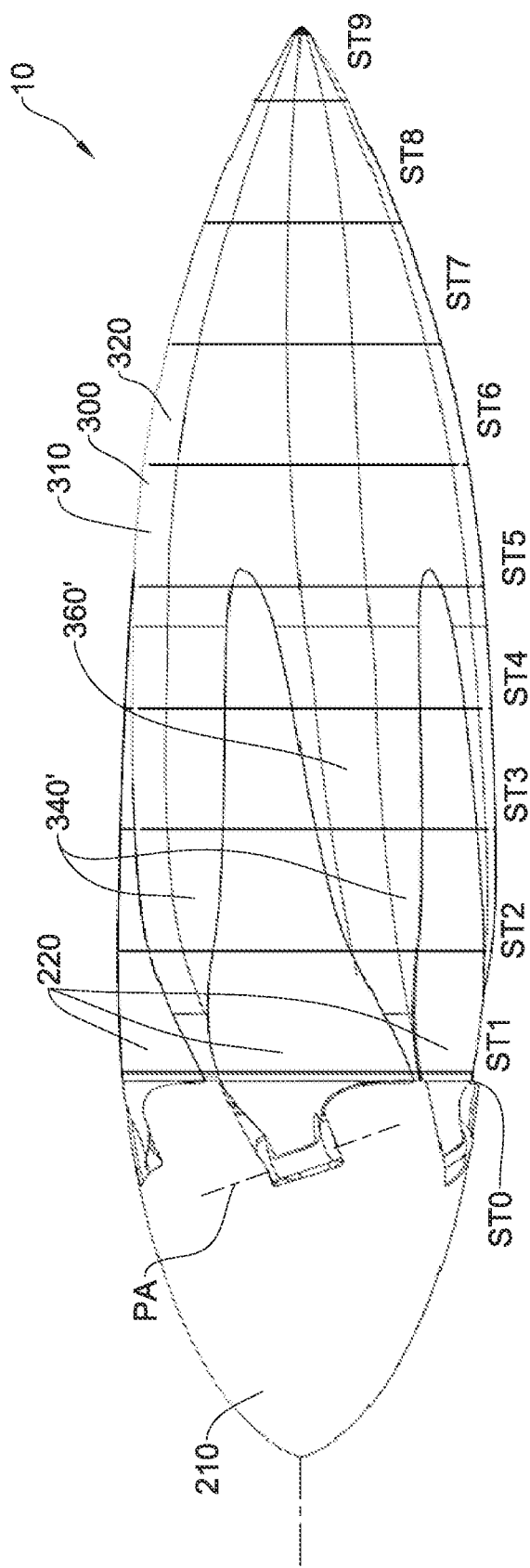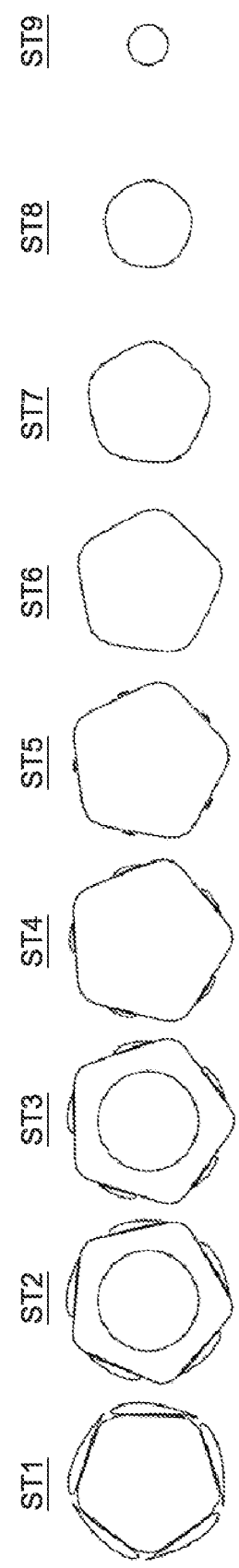
Fig. 12(a)
Fig. 12(b)

ST0  ST1

ST0  ST1

PROPULSION SYSTEM

TECHNOLOGICAL FIELD

The presently disclosed subject matter relates to propulsion systems, in particular to propulsion systems incorporating foldable propellers.

BACKGROUND

There are a variety of applications in which a rotor is rotatably mounted to a nacelle, and in which the rotor blades are folded over the nacelle at certain conditions.

Some such applications include aerospace applications, and also relate to propulsion units of distributed electric propulsion (DEP) systems.

For example, by way of non-limiting example, "A Performance Analysis of Folding Conformal Propeller Designs" (Litherland et al, AIAA Aviation 2019 Forum, 17-21 Jun. 2019, Dallas, Texas) discloses a high-lift system for the X-57 that includes propellers in which the propeller blades are folded conformally along the nacelle at certain operating conditions.

Also by way of non-limiting example, "A method for Designing Conforming Folding Propellers" (Litherland et al, 17th AIAA Aviation Technology, Integration, and Operations Conference, 5-9 Jun. 2017, Denver, Colorado) discloses a method for deigning folding blade configurations that conform to the nacelle surface when stowed.

GENERAL DESCRIPTION

According to a first aspect of the presently disclosed subject matter there is provided a propulsion system comprising a rotor arrangement and a nacelle, the rotor arrangement being rotatably mounted with respect to the nacelle about a rotor axis:
  the rotor arrangement comprising a plurality of rotor blades, each rotor blade being pivotably mounted to a hub element about a respective blade pivot axis, said rotor blades being deployable between an undeployed configuration and a deployed configuration;
  the nacelle comprising a nacelle body having a nacelle outer surface, the nacelle outer surface comprising a plurality of facet elements and a plurality of transition elements, said facet element extending aft from the hub element, each adjacent pair of said facet elements being circumferentially spaced from one another by a corresponding said transition element, each facet element having a first curvature with respect to said rotor axis, each transition element having a second curvature with respect to said rotor axis,
  wherein said first curvature is different from said second curvature; and
  wherein in said undeployed configuration, each said rotor blade is in overlying and fully external relationship with respect to a corresponding said facet element.

For example, said first curvature is significantly less in magnitude than said second curvature.

Additionally or alternatively, for example, wherein said first curvature is non-circular with respect to said rotor axis.

Additionally or alternatively, for example, said first curvature is conformal with respect to a portion of the pressure surface of a respective said rotor blade, said portion being defined between a forward and an aft contact point between the rotor blade and the facet element.

Additionally or alternatively, for example, an orientation of a cross-section of each respective facet element varies along rotor axis corresponding to a variation of twist angle of the rotor blades.

Additionally or alternatively, for example, said first curvature is non-concave.

Additionally or alternatively, for example, said second curvature is circular with respect to said rotor axis.

Additionally or alternatively, for example, said second curvature is non-flat with respect to said rotor axis.

Additionally or alternatively, for example, said first curvature corresponds to a generally flat surface.

Additionally or alternatively, for example, each said transition element is geometrically contoured to provide a smooth geometrical transition between adjacent said facet elements.

Additionally or alternatively, for example, each said transition element is geometrically contoured to provide a non-discontinuous geometrical transition between adjacent said facet elements.

Additionally or alternatively, for example, in said undeployed configuration, each said rotor blade is in a non-recessed relationship with respect to the respective said facet element.

Additionally or alternatively, for example, said nacelle body is non-axisymmetric with respect to the rotor axis.

Additionally or alternatively, for example, each said rotor blade comprises a plurality of aerofoil sections extending between a respective blade root to a respective blade tip, each said aerofoil section comprising a respective aerofoil leading edge, a respective aerofoil trailing edge, a respective aerofoil chord, a respective aerofoil suction surface profile and a respective aerofoil pressure surface profile, and wherein for each said aerofoil section in the undeployed configuration, the respective said pressure surface profile is in abutting contact with or at a minimum proximity with respect to a corresponding facet transverse section of the respective said facet element at least at one of:
  a first matching point, corresponding to a respective forward aerofoil location and a corresponding respective first facet section location on said corresponding facet transverse section of the respective facet element; and
  a second matching point, corresponding to a respective aft aerofoil location and a corresponding respective second facet section location on said corresponding facet transverse section of the respective facet element.

For example, in said undeployed configuration, at least the respective transition transverse section of each adjacent said transition element of each respective facet element wholly lies on a first transverse side of a respective chord line that is co-aligned with the respective said aerofoil chord, wherein said first transverse side further includes at least a part of the respective pressure surface extending aft of the respective aerofoil leading edge.

Additionally or alternatively, for example, in said undeployed configuration, at least the respective transition transverse section of each adjacent said transition element of each respective facet element wholly lies on a second transverse side of a respective first line parallel to a chord line and intersecting said first matching point, or wherein said respective first line is tangential to said first matching point, wherein said chord line is co-aligned with the respective said aerofoil chord, wherein said second transverse side is closer to the respective pressure surface of the respective aerofoil leading edge than the respective suction surface thereof. For example, such a first line is a rectilinear line.

Additionally or alternatively, for example, in said undeployed configuration, at least the respective transition transverse section of each adjacent said transition element of each respective facet element wholly lies on a third transverse side of a respective second line intersecting said first matching point and said second matching point, wherein said third transverse side is closer to the respective pressure surface of the respective aerofoil leading edge than the respective suction surface thereof. For example, such a second line is a rectilinear line.

Additionally or alternatively, for example, a respective third line, joining a first point and a second point, wholly lies outside of any part of the respective aerofoil section corresponding to the facet transverse section, wherein said first point and said second point are non-identical, and wherein said first point and said second point are each defined anywhere on a forward part of the respective facet transverse section forward of the respective first matching point, or anywhere on an adjacent respective transition transverse section that is forward of, and joined to, said respective forward part. For example, such a third line is a rectilinear line.

Additionally or alternatively, for example, a respective fourth line, joining a third point and a fourth point, wholly lies outside of any part of the respective aerofoil section corresponding to the facet transverse section, wherein said third point and said fourth point are non-identical, and wherein said third point and said fourth point are each defined anywhere on the respective facet transverse section, or anywhere on an adjacent respective transition transverse section that is forward of, and joined to, said respective facet transverse section. For example, such a fourth line is a rectilinear line.

Additionally or alternatively, for example, the propulsion system includes at least one of:
wherein the forward aerofoil contact point is aft of the respective aerofoil leading edge by a first spacing, wherein said first spacing is in the range of zero to 35% of the respective aerofoil chord;
wherein the aft aerofoil contact point is forward of the respective aerofoil trailing edge by a second spacing, wherein said second spacing is in the range of zero to 35% of the respective aerofoil chord.

Additionally or alternatively, for example, for each respective said facet transverse section, the respective first location and the respective second location define therebetween a respective facet section segment, wherein each said facet section segment has a non-circular facet segment curvature.

For example, said facet segment curvature is less than a curvature of a circle arc having center at rotor axis and intersecting at least one of the first position or the second position.

Additionally or alternatively, for example, said facet segment curvature is greater than a curvature of a circle arc having a center thereof at rotor axis and intersecting at least one of the first position or the second position.

Additionally or alternatively, for example, each said facet element is joined to each adjacent transition element along a respective transition line defined at each said corresponding facet transverse section at the respective said first position or the respective said second position.

Additionally or alternatively, for example, each said facet element is joined to each adjacent transition element along a respective transition line defined at each said corresponding facet transverse section at a location corresponding to the respective said first position or the respective said second position of the forwardmost said facet transverse section.

Additionally or alternatively, for example, the propulsion system comprises an equal number of said facet elements as said transition elements.

Additionally or alternatively, for example, the propulsion system includes one of:
wherein the propulsion system comprises an equal number of said facet elements as said rotor blades;
wherein the propulsion system comprises a first number of said facet elements and a second number of said rotor blades, wherein said first number is an integer multiple of said second number.

Additionally or alternatively, for example, the propulsion system comprises five said facet elements and five said rotor blades.

Additionally or alternatively, for example, a cross-sectional profile of the nacelle varies from a front end thereof to an aft end thereof, from a generally polygonal cross section with rounded corners to a general circular or other rounded cross-section.

Additionally or alternatively, for example, a cross-sectional profile of the nacelle varies from a front end thereof to an aft end thereof, from a generally pentagonal cross section, with rounded corners to a general circular or other rounded cross-section.

Additionally or alternatively, for example, a cross-sectional profile shape of the nacelle is relatively constant in an axial direction from a front end thereof to an axial location corresponding to an axial location of the blade tips of the rotor blades in undeployed configuration.

According to a second aspect of the presently disclosed subject matter there is provided an air vehicle comprising at least one propulsion system as defined herein regarding the first aspect of the presently disclosed subject matter.

According to the first aspect of the presently disclosed subject matter there is also provided a nacelle for a propulsion system having a rotor arrangement, in which the nacelle is configured for enabling the rotor arrangement to be rotatably mounted with respect to the nacelle about a rotor axis, and in which the rotor arrangement comprising a plurality of rotor blades pivotably mounted to a hub element about a blade pivot axis, said rotor blades being deployable between an undeployed configuration and a deployed configuration;
the nacelle comprising a nacelle body having a nacelle outer surface, the nacelle outer surface comprising a plurality of facet elements and a plurality of transition elements, said facet elements extending aft from the hub element, each adjacent pair of said facet elements being circumferentially spaced from one another by a corresponding said transition element, each facet element having a first curvature with respect to said rotor axis, each transition element having a second curvature with respect to said rotor axis, wherein said first curvature is different from said second curvature; and
wherein in said undeployed configuration, each said rotor blade is in overlying and fully external relationship with respect to a corresponding said facet element.

For example, said first curvature is significantly less in magnitude than said second curvature.

Additionally or alternatively, for example, said first curvature is non-circular with respect to said rotor axis.

Additionally or alternatively, for example, said first curvature varies along rotor axis corresponding to a variation of twist angle of the rotor blades.

Additionally or alternatively, for example, said first curvature is non-concave.

Additionally or alternatively, for example, said second curvature is circular with respect to said rotor axis.

Additionally or alternatively, for example, said second curvature is non-flat with respect to said rotor axis.

Additionally or alternatively, for example, said first curvature corresponds to a generally flat surface.

Additionally or alternatively, for example, each said transition element is geometrically contoured to provide a smooth geometrical transition between adjacent said facet elements.

Additionally or alternatively, for example, each said transition element is geometrically contoured to provide a non-discontinuous geometrical transition between adjacent said facet elements.

Additionally or alternatively, for example, in said undeployed configuration, each said rotor blade is in a non-recessed relationship with respect to the respective said facet element.

Additionally or alternatively, for example, said nacelle body is non-axisymmetric with respect to the rotor axis.

Additionally or alternatively, for example, the nacelle comprises an equal number of said facet elements as said transition elements.

Additionally or alternatively, for example, the nacelle comprises five said facet elements.

Alternatively, for example, a cross-sectional profile of the nacelle varies from a front end thereof to an aft end thereof, from a generally polygonal cross section with rounded corners to a general circular or other rounded cross-section.

Additionally or alternatively, for example, a cross-sectional profile of the nacelle varies from a front end thereof to an aft end thereof, from a generally pentagonal cross section, with rounded corners to a general circular or other rounded cross-section.

Additionally or alternatively, for example, a cross-sectional profile shape of the nacelle is relatively constant in an axial direction varies from a front end thereof to an axial location corresponds to an axial location of the blade tips of the rotor blades in undeployed configuration.

According to the first aspect of the presently disclosed subject matter there is also provided a propulsion system comprising a rotor arrangement and a nacelle, the rotor arrangement being rotatably mounted with respect to the nacelle about a rotor axis:

the rotor arrangement comprising a plurality of rotor blades, each rotor blade being pivotably mounted to a hub element about a respective blade pivot axis, said rotor blades being deployable between an undeployed configuration and a deployed configuration;

the nacelle comprising a nacelle body having a nacelle outer surface, the nacelle outer surface comprising a plurality of facet elements and a plurality of transition elements, said facet element extending aft from the hub element, each adjacent pair of said facet elements being circumferentially spaced from one another by a corresponding said transition element, each facet element having a first curvature with respect to said rotor axis, each transition element having a second curvature with respect to said rotor axis, wherein the first curvature and the second curvature are flat; and wherein in said undeployed configuration, each said rotor blade is in overlying and fully external relationship with respect to a corresponding said facet element.

A feature of at least one example according to the presently disclosed subject matter is that a propulsion system is provided having a reduced level of parasitic drag in the undeployed configuration, as compared with at least some other alternative configurations.

Another feature of at least one example according to the presently disclosed subject matter is that a propulsion system is provided enabling improved aerodynamic performance, for example improved loiter and/or cruise performance, to an air vehicle in the undeployed configuration, as compared with at least some other alternative configurations.

Another feature of at least one example according to the presently disclosed subject matter is that a propulsion system is provided in which, in the undeployed configuration, downstream aerodynamic disturbance can be minimized, and potential adverse interaction with air vehicle control surfaces can be minimized, as compared with at least some other alternative configurations.

Another feature of at least one example according to the presently disclosed subject matter is that a propulsion system is provided in which the geometry of the respective nacelle can be optimized geometrically to other parameters of the propulsion system, for example one or more of: number of rotor blades; blade profile, for example MIL or DEP or any other profile.

Another feature of at least one example according to the presently disclosed subject matter is that a propulsion system is provided in which the internal volume of the nacelle is configured for accommodating therein a motor, while providing sufficient clearance between the motor and the inside of the nacelle for heat transfer, and wherein the clearance between the motor and the nacelle is nonuniform circumferentially, thereby providing additional spaces for wiring.

Another feature of at least one example according to the presently disclosed subject matter is that a propulsion system is provided in which the internal volume of the nacelle is configured for accommodating therein a motor, while providing sufficient clearance between the motor and the inside of the nacelle for heat transfer, and wherein the clearance between the motor and the nacelle can be optimized for channeling of wiring, electric and electronic components therethrough.

Another feature of at least one example according to the presently disclosed subject matter is that a propulsion system is provided in which the rotor blades can be deployed from the undeployed configuration to the deployed configuration without the need for a dedicated deployment mechanism specifically configured to drive such deployment.

Another feature of at least one example according to the presently disclosed subject matter is that a propulsion system is provided in which the rotor blades can be stowed from the deployed configuration to the undeployed configuration in a relatively simple manner, in which rotation of the rotor blades is stopped and the rotor blades locked at angular dispositions about the rotor axis corresponding to the position of the respective facet elements.

Another feature of at least one example according to the presently disclosed subject matter is that a propulsion system is provided in which the rotor blades can be locked in the undeployed configuration using simple mechanical or magnetic arrangements, as compared with at least some other alternative configurations.

Another feature of at least one example according to the presently disclosed subject matter is that a propulsion system is provided in which the electric motor(s) of the drive unit comprise magnetic elements for locking the rotor blades in the undeployed configuration. Another feature of at least one example according to the presently disclosed subject matter is that a propulsion system is provided having reduced noise signature in the undeployed configuration, as compared with at least some other alternative configurations.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 5(a) shows in top view a rotor blade of the example of FIG. 1(a); FIG. 5(b) shows transverse cross-sectional views of aerofoil sections corresponding to the rotor blade of the example of FIG. 5(a)

FIG. 9(a) is a detail transverse cross-sectional view of a portion of the example of FIG. 9, showing the position of a respective first line parallel to the chord line; FIG. 9(b) is a detail transverse cross-sectional view of a portion of the example of FIG. 9, showing the position of a respective second line connecting the respective first and second matching points; FIG. 9(c) is a detail transverse cross-sectional view of a portion of the example of FIG. 9, showing an example of a rectilinear line defined by two points, each point being defined anywhere on a forward part of the respective major facet section segment or anywhere on an adjacent transition transverse section; FIG. 9(d) is a detail transverse cross-sectional view of a portion of the example of FIG. 9, showing an example of a rectilinear line defined by two points, each point being defined anywhere on a respective facet transverse cross-section or anywhere on an adjacent transition transverse section.

FIG. 12(a) is a side view of an alternative variation of the example of FIG. 1(a) in undeployed configuration; FIG. 12(b) is a series of transverse cross-sectional views of a plurality of longitudinal stations defined with respect to the example of FIG. 12(a).

DETAILED DESCRIPTION

Figure 1:
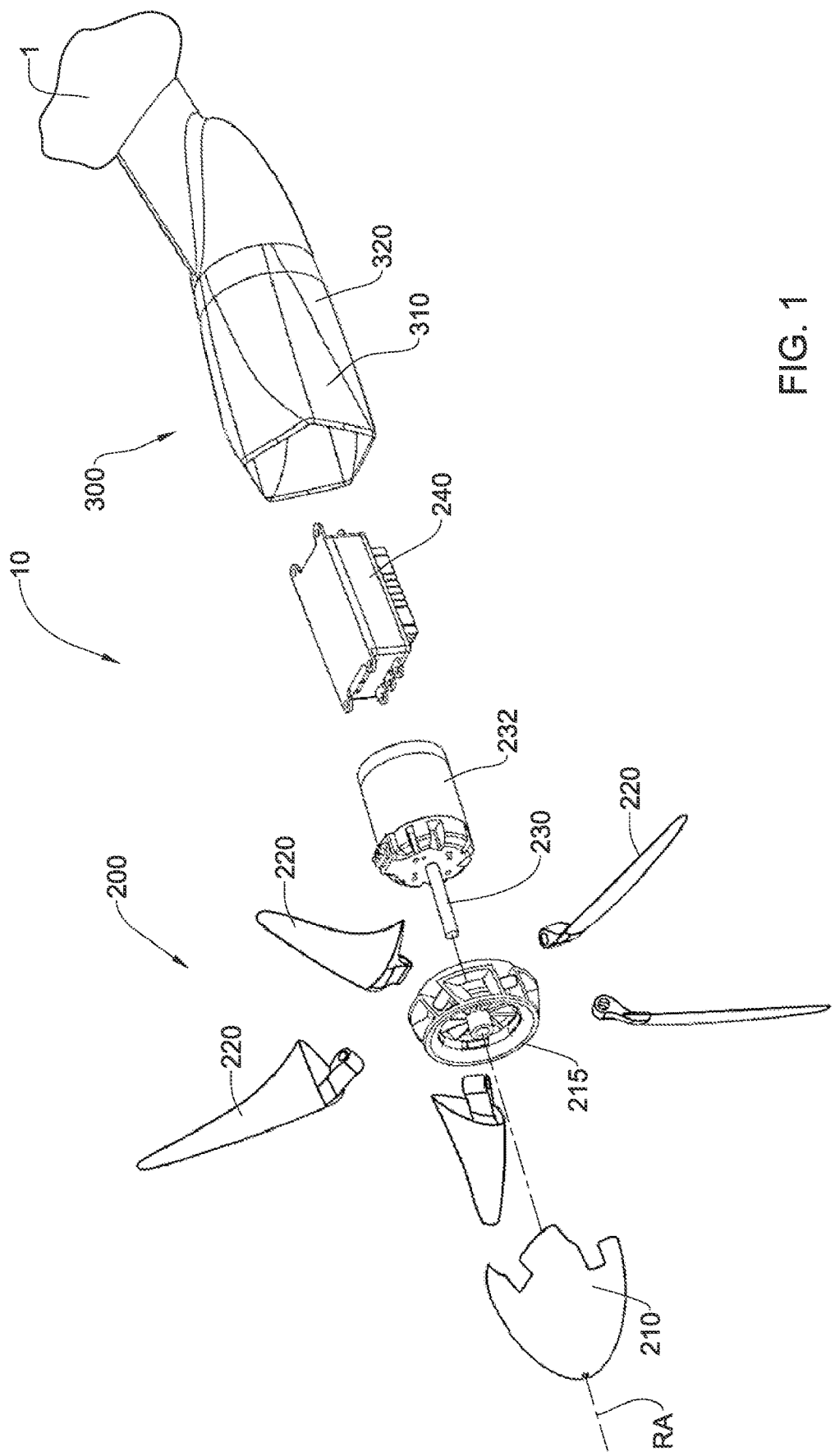
FIG. 1 is an isometric exploded view of an example of the propulsion system in deployed configuration according to the presently disclosed subject matter.
Figure 1A:
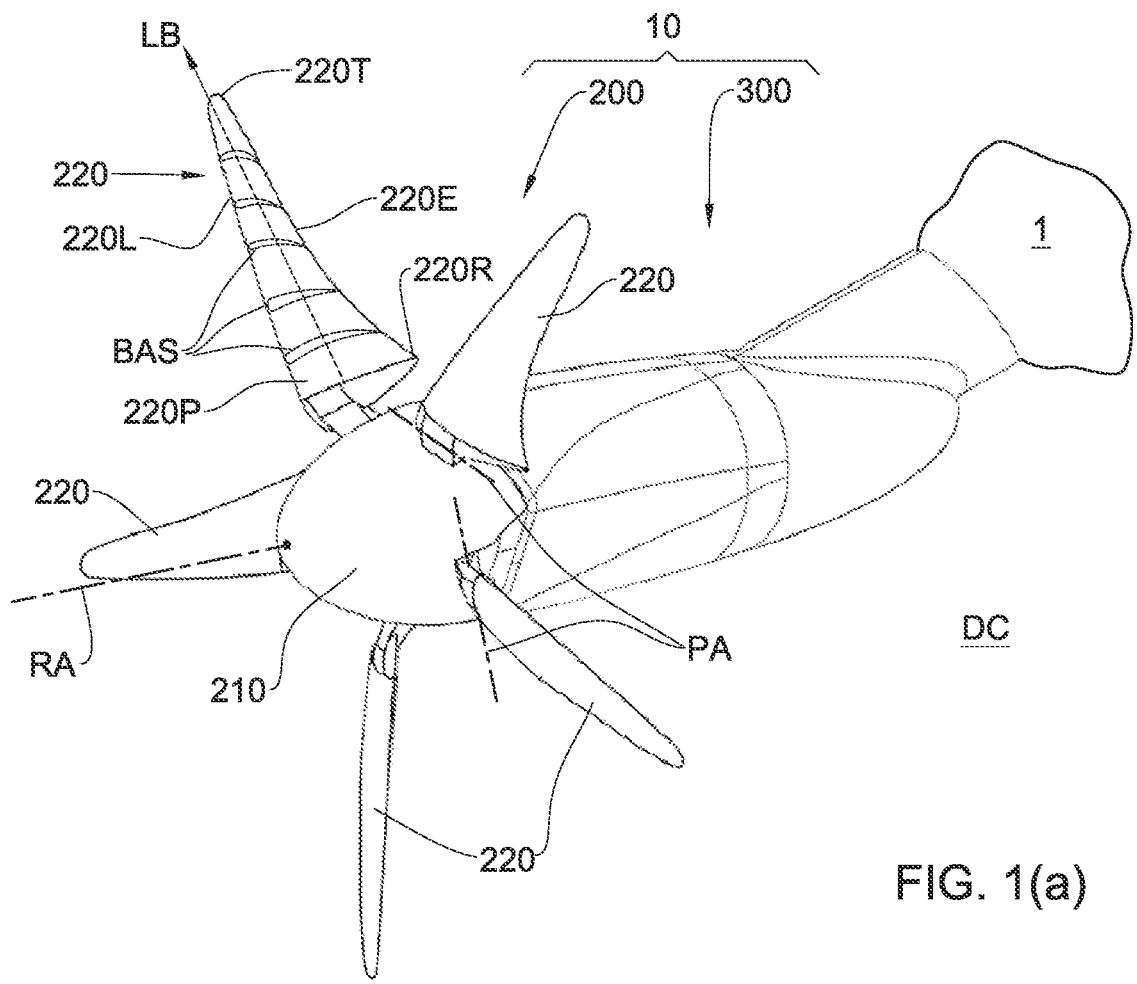
FIG. 1(a) is an isometric (assembled) view of the example of FIG. 1 in deployed configuration.
Figure 1B:
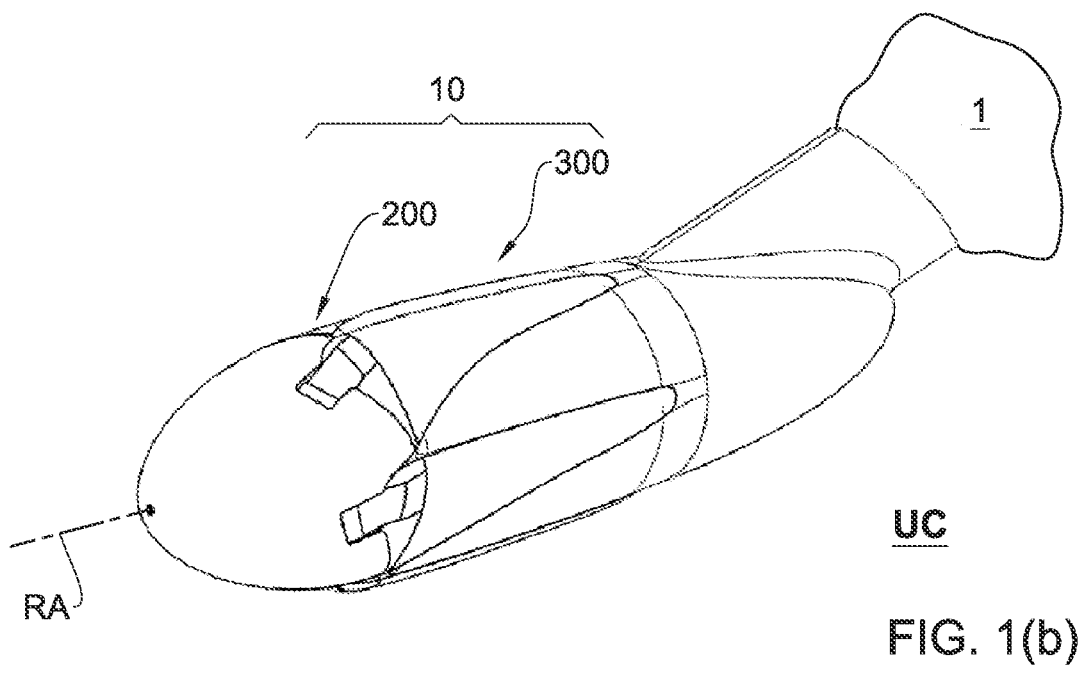
FIG. 1(b) is an isometric view of the example of FIG. 1(a) in undeployed configuration.
Figure 2A:
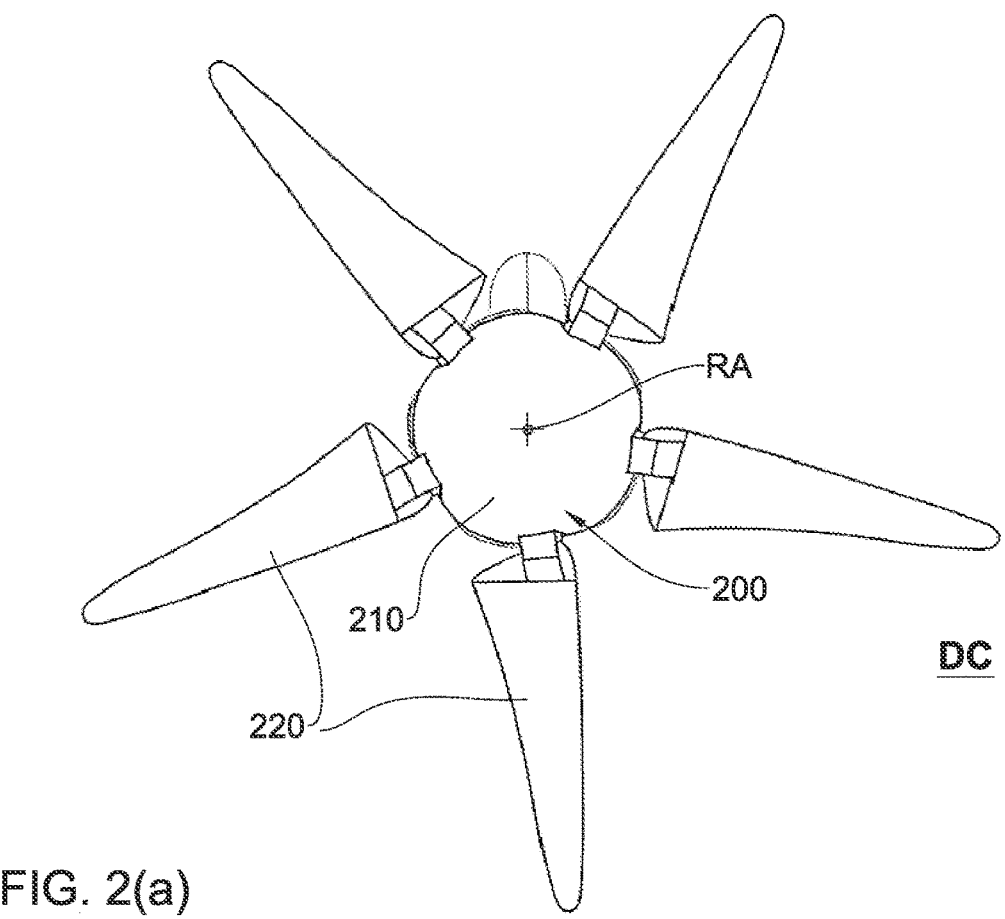
FIG. 2(a) is a front view of the example of FIG. 1(a) in deployed configuration.
Figure 2B:
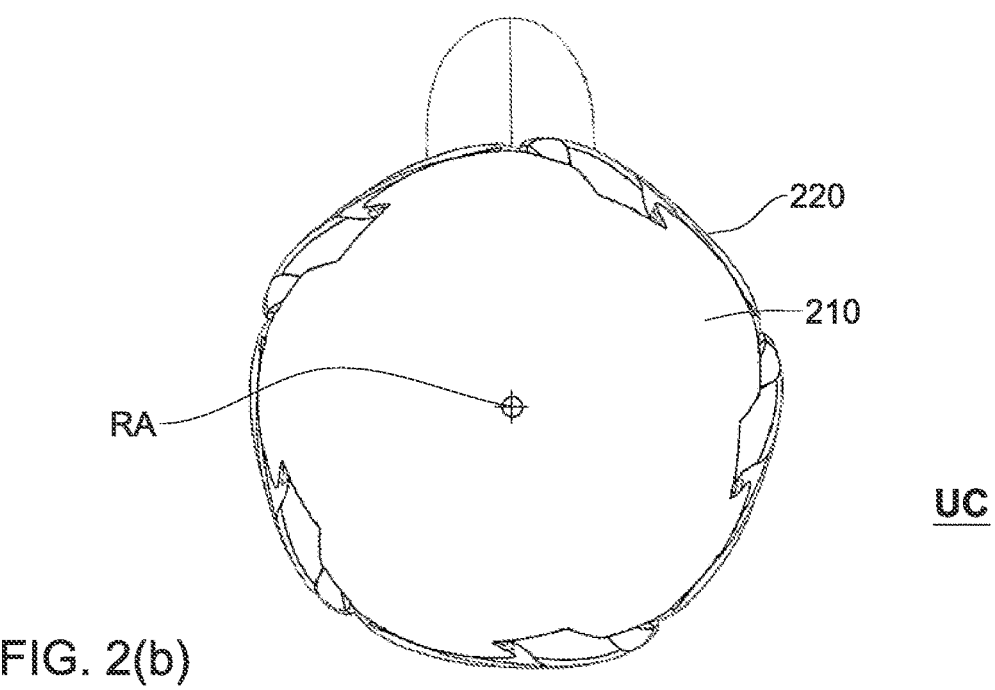
FIG. 2(b) is a front view of the example of FIG. 1(a) in undeployed configuration.
Figure 3A:
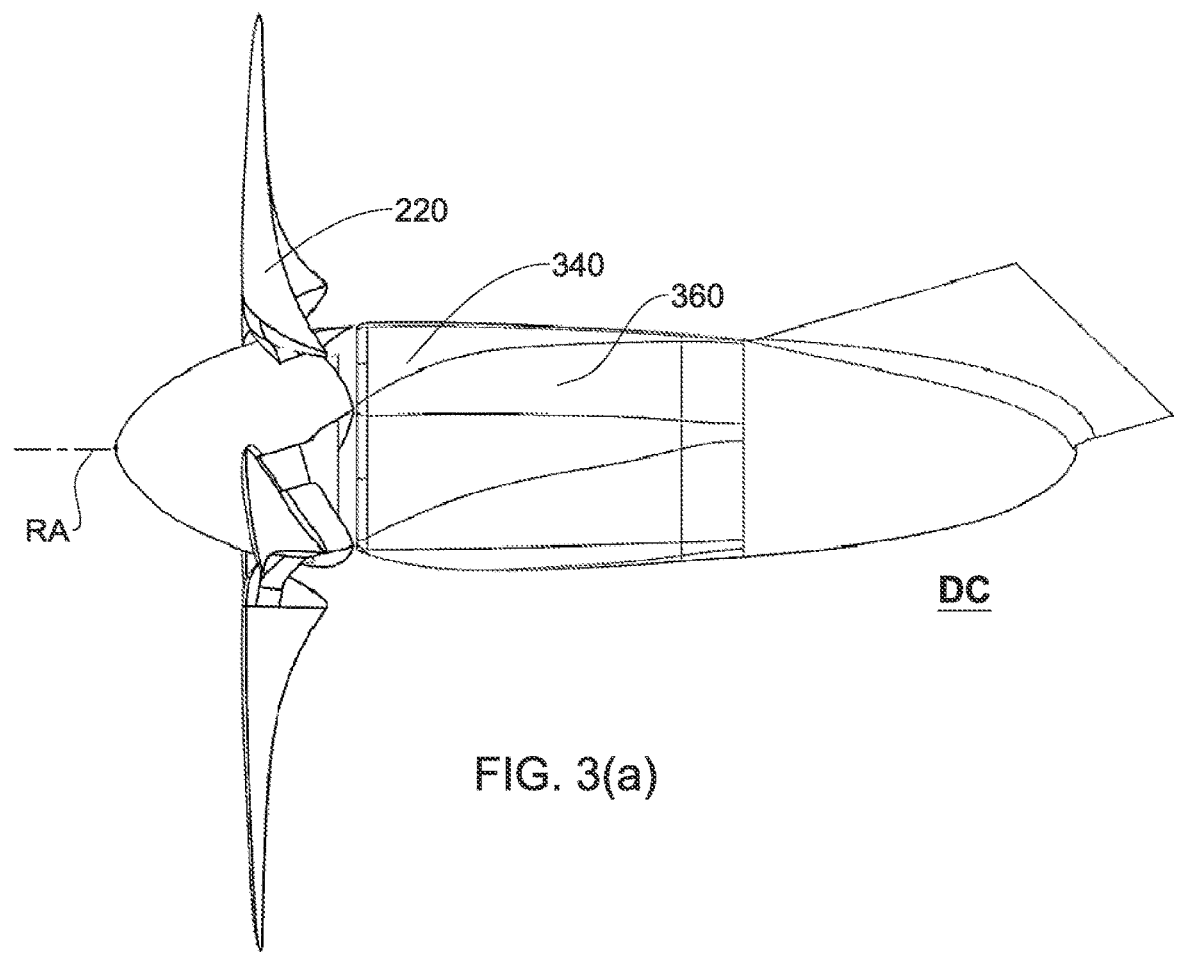
FIG. 3(a) is a side view of the example of FIG. 1(a) in deployed configuration.
Figure 3B:
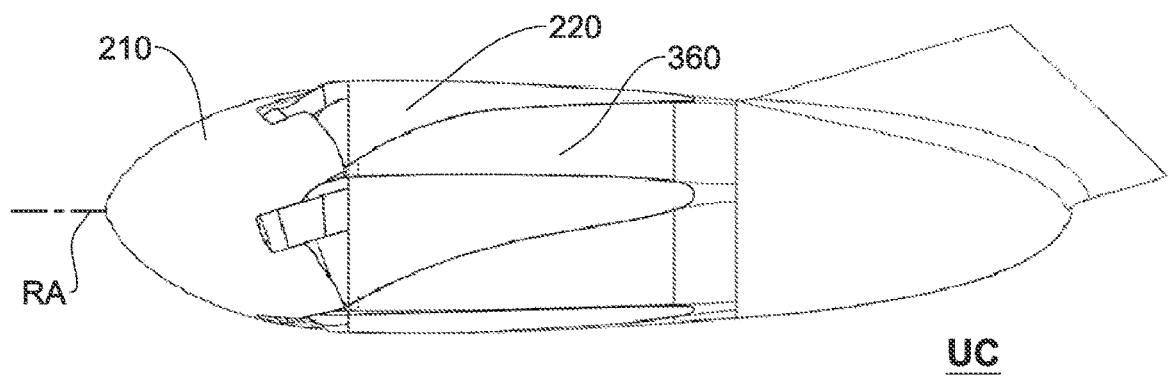
FIG. 3(b) is a side view of the example of FIG. 1(a) in undeployed configuration.
Figure 4A:
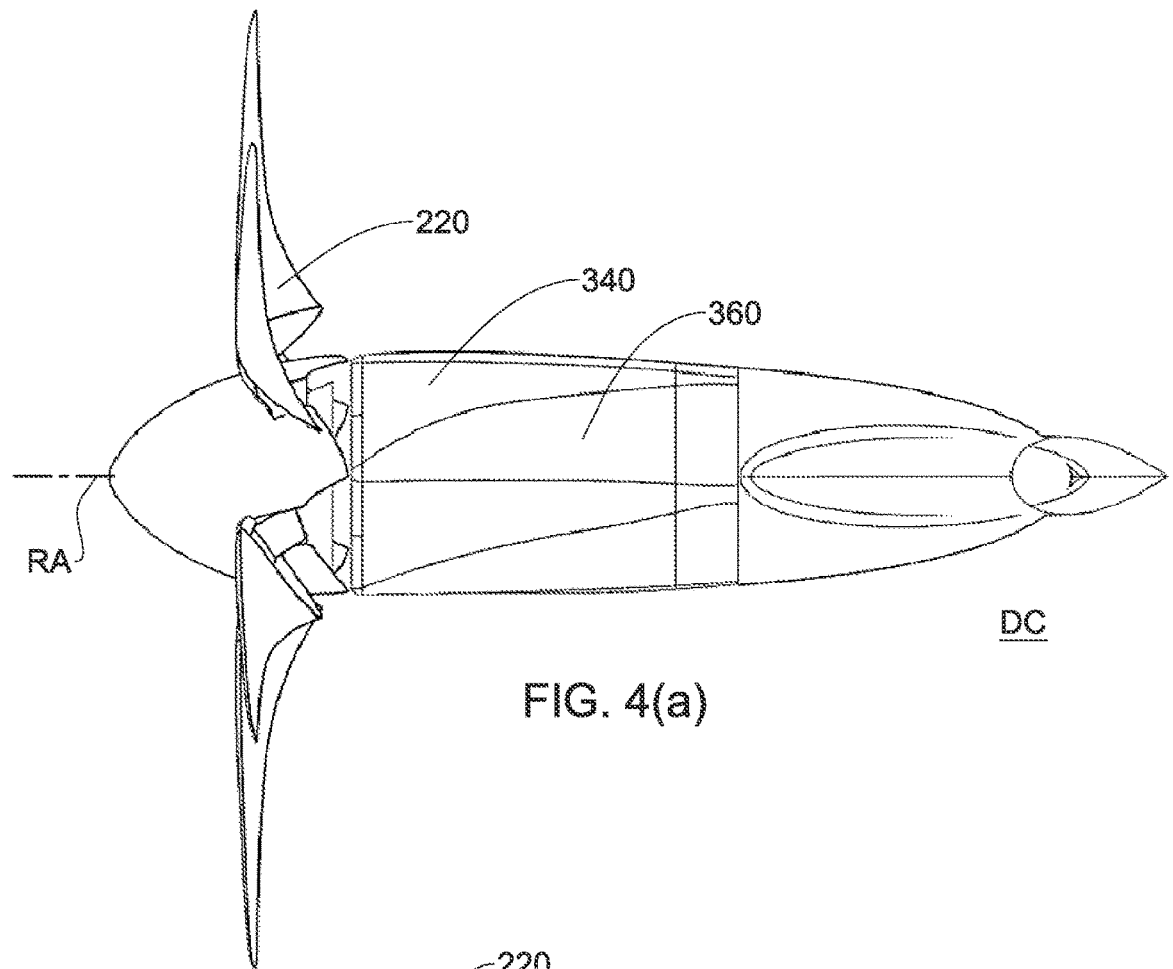
FIG. 4(a) is a top view of the example of FIG. 1(a) in deployed configuration.
Figure 4B:
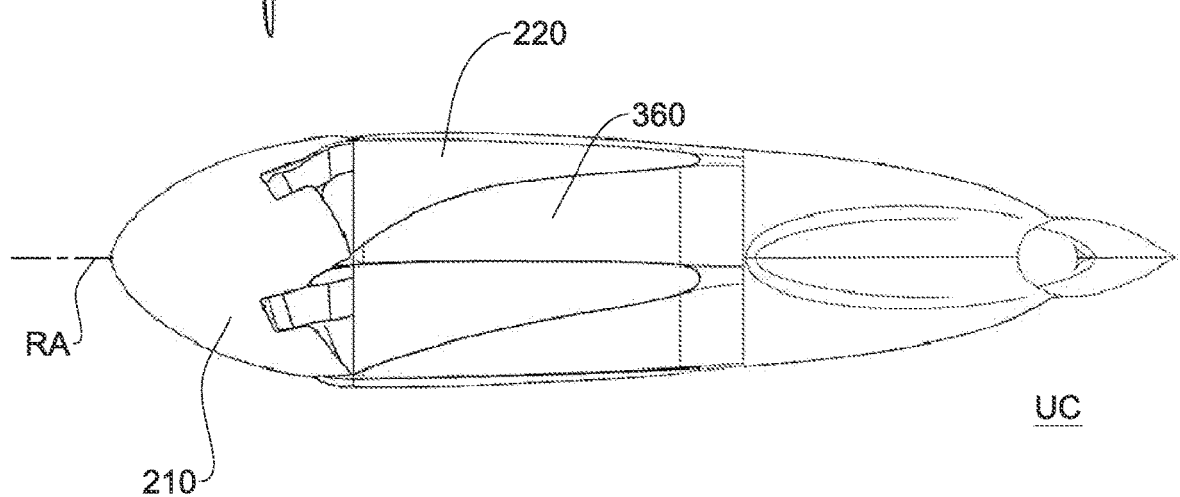
FIG. 4(b) is a top view of the example of FIG. 1(a) in undeployed configuration.

According to an aspect of the presently disclosed subject matter, and referring to FIGS. 1 to 4(b), a propulsion system according to a first example of the presently disclosed subject matter, generally designated with reference numeral 10, comprises a rotor arrangement 200 and a nacelle 300, which is per se novel.

The rotor arrangement 200 is rotatably mounted with respect to the nacelle 300 about a rotor axis RA.

The nacelle 300 is configured for accommodating therein a drive unit for the rotor arrangement 200. For example, such a drive unit can comprise one or more electrical motors 230, and can also include wiring and/or an electronic speed controller (ESC) 240 coupled to the electrical motors. The electrical motor 230 has a drive shaft 232 co-axial with the rotor axis, and on which the rotor arrangement is mounted for rotation therewith. Alternatively, the driveshaft 232 can be coupled to the rotor arrangement 200 via a suitable transmission system.

While at least in this example, the propulsion system 10 finds particular application for providing propulsion for an air vehicle 1, the presently disclosed subject matter is not limited thereto, and can be implemented in other applications, for example marine vehicles, hovercraft, and so on.

For example, the propulsion system 10 can be mounted to a wing, empennage or fuselage of such an air vehicle 1, or to a pod, boom or other parts of the air vehicle 1.

For example, the propulsion system 10 can constitute one of a plurality of propulsion units of a distributed electric propulsion (DEP) system, that can be used to selectively provide augmented lift to an air vehicle at certain parts of the flight envelope, for example take-off and/or landing, and that can be used to selectively provide excess thrust to an air vehicle at take-off, climb and so on. For example, such a DEP can be installed on the wings of the respective air vehicle. In other parts of the flight envelope one or more such propulsion units of the DEP system can be selectively uncoupled electrically, when less or no such augmented lift is required, for example at cruise or loiter.

For example, in at least some examples of such applications in which a plurality of propulsions systems 10 can be provided for a DEP, in the undeployed configuration, downstream aerodynamic disturbance from each propulsion system 10 can be minimized, and potential adverse interaction with air vehicle control surfaces can be minimized, as compared with at least some other alternative configurations.

Figure 16A:
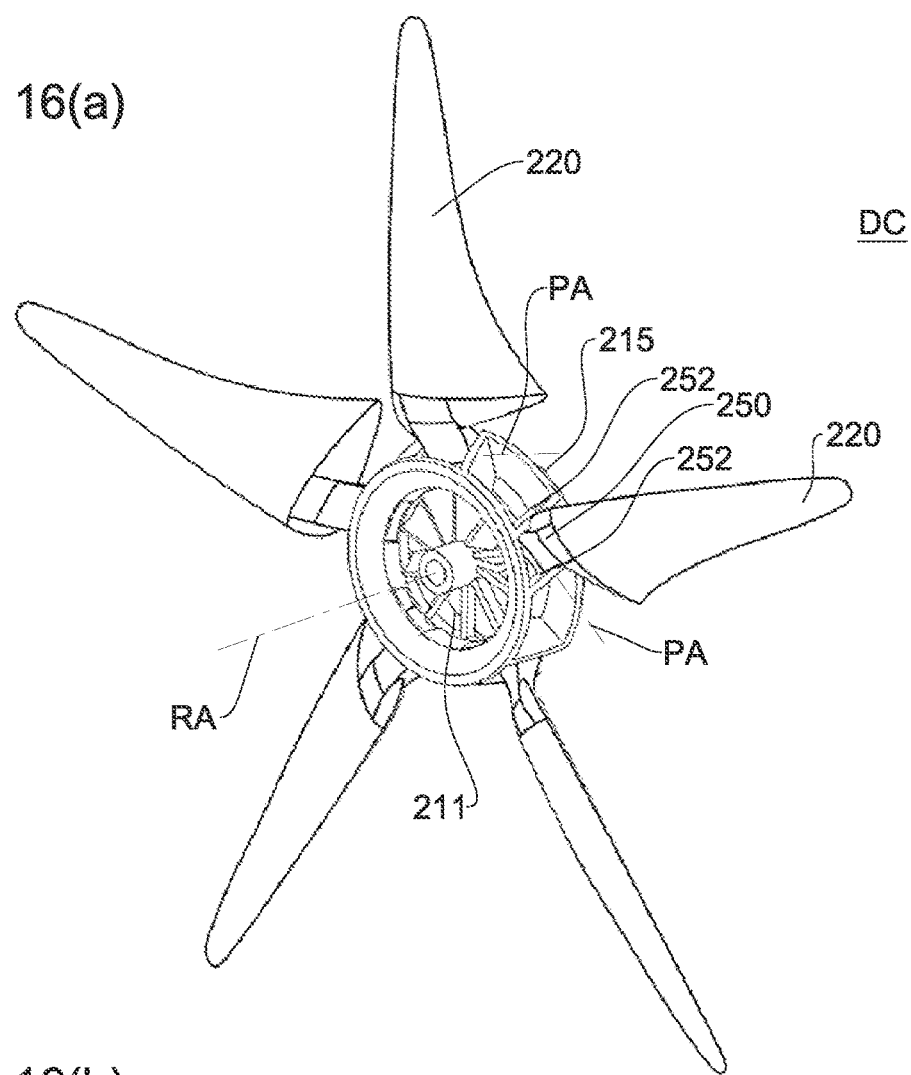
FIG. 16(a) is an isometric view of the hub element and rotor blades of the example of FIG. 1 in deployed configuration.
Figure 16B:
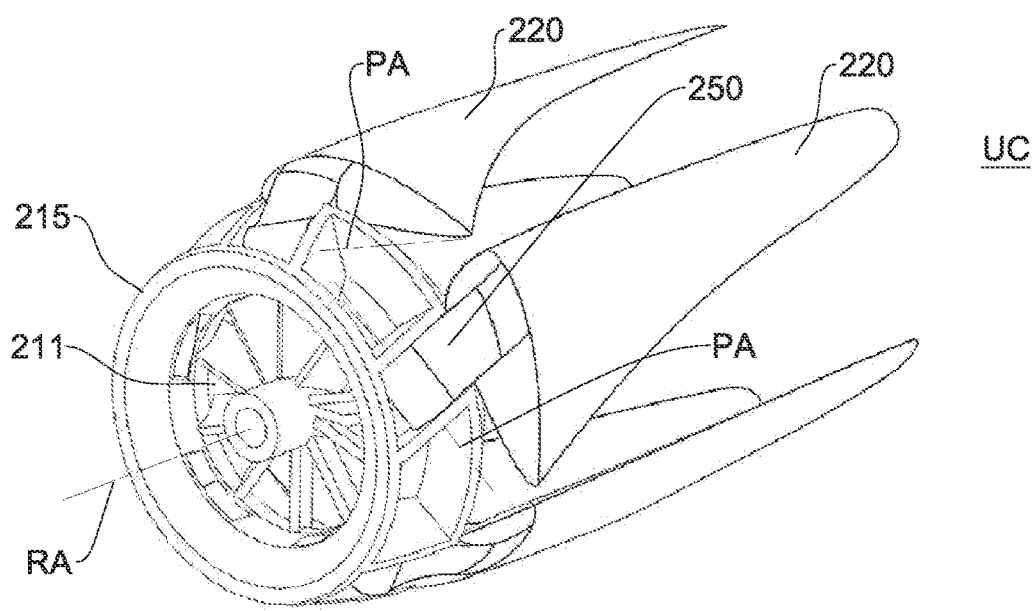
FIG. 16(b) is an isometric view of the hub element and rotor blades of the example of FIG. 1(a) in undeployed configuration.

Referring to FIG. 1, and also to FIGS. 16(a) and 16(b), the rotor arrangement 200 comprises a plurality of rotor blades 220, each rotor blade 220 being pivotably mounted to a hub element 215 about a respective blade pivot axis PA, and an aerodynamic fairing 210 (also referred to herein as a spinner) is mounted to the hub element 215.

According to an aspect of the presently disclosed subject matter, the rotor blades 220 are deployable between an undeployed configuration (also interchangeably referred to herein as the stowed configuration or the folded configuration) UC and a deployed configuration DC, by reversibly pivoting about the respective pivot axes PA.

Thus, and referring in particular to FIG. 16(a), each blade element 220 comprises a respective boss 250 rigidly affixed to the blade root 220R. Referring also to FIGS. 17(a), 17(b), 17(c), 17(d), 17(e), the boss 250 is pivotably mounted with respect to two respective hub brackets 252 about the respective pivot axis PA, for example via a respective pin 253. Thus, each pin 253 is coaxial with the respective pivot axis PA.

Each boss 250 has an axial length AL (along the respective pivot axis PA) nominally corresponding to the axial length of the respective pin 253 which is also equal to the spacing between the respective brackets 252 (along the respective pivot axis PA).

The inclination of each pivot axis PA with respect to the plane of rotation POR of the rotor arrangement 200 about the rotor axis RA and/or with respect to the rotor axis RA can be set such as to provide for a flush overlying relationship for the rotor blades 220 in the undeployed configuration UC with respect to the facet elements 340, while providing a desired positive pitch in the deployed configuration DC, for example.

Figure 17B:
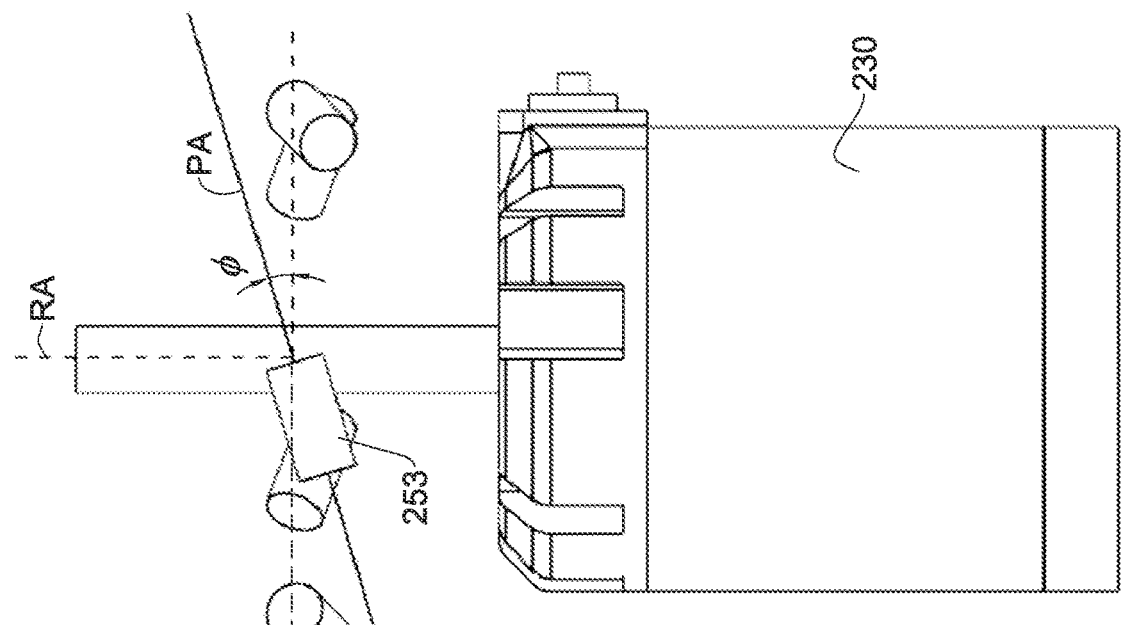
FIG. 17(b) is a side view of the example of FIG. 17(a)
Figure 17A:
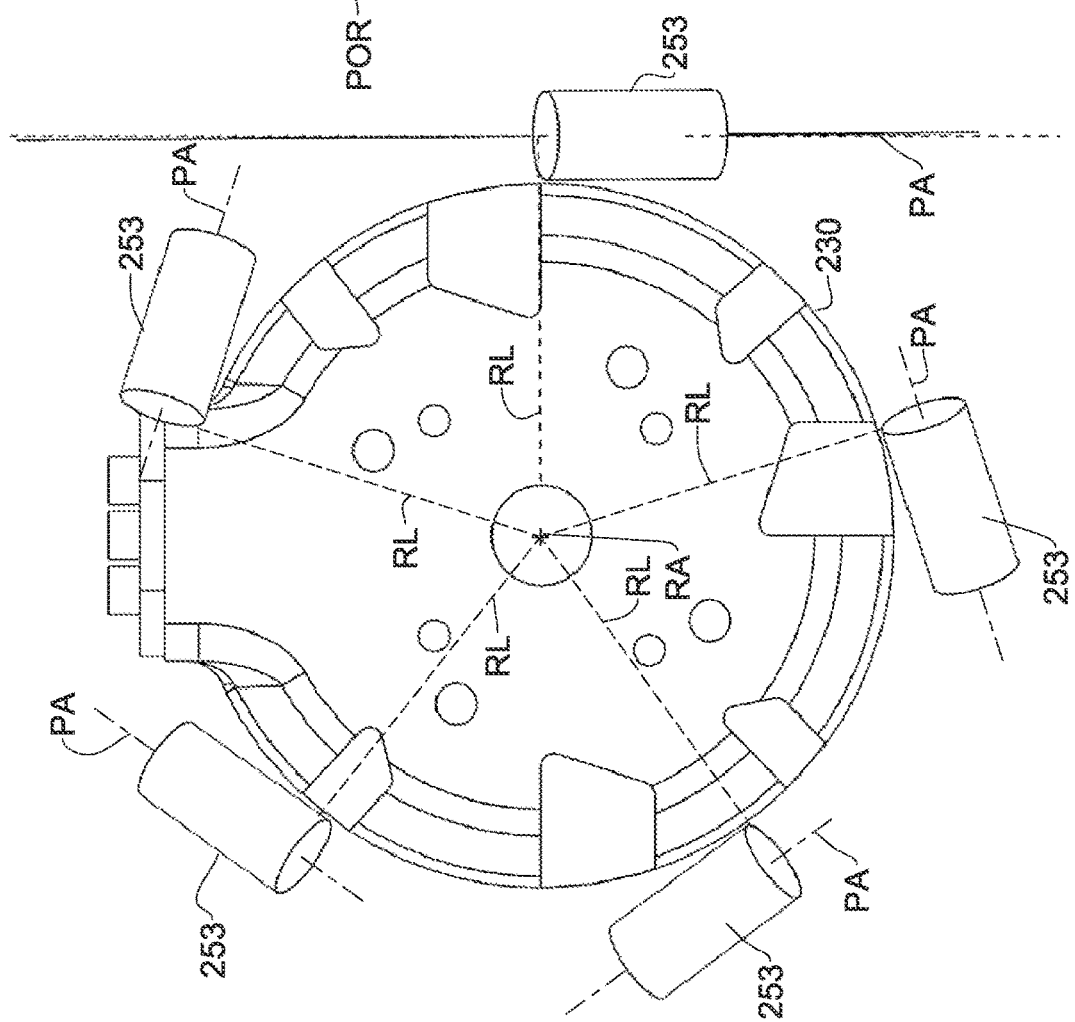
FIG. 17(a) is a front view of the example of FIG. 1 illustrating a spatial relationship between the pivot axes and rotor axis thereof.
Figure 17C:
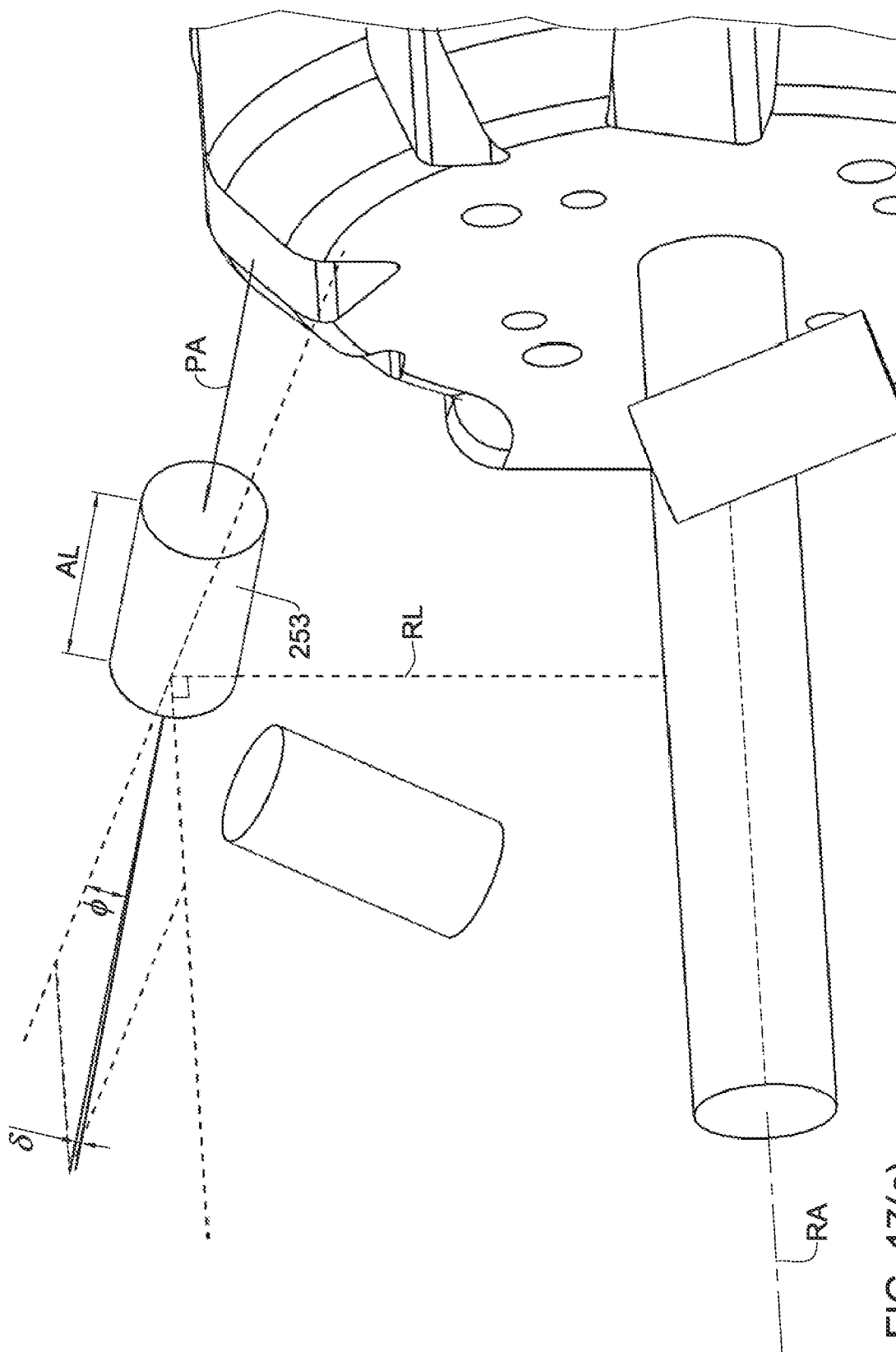
FIG. 17(c) is an isometric view of the example of FIG. 17(a)
Figure 17D:
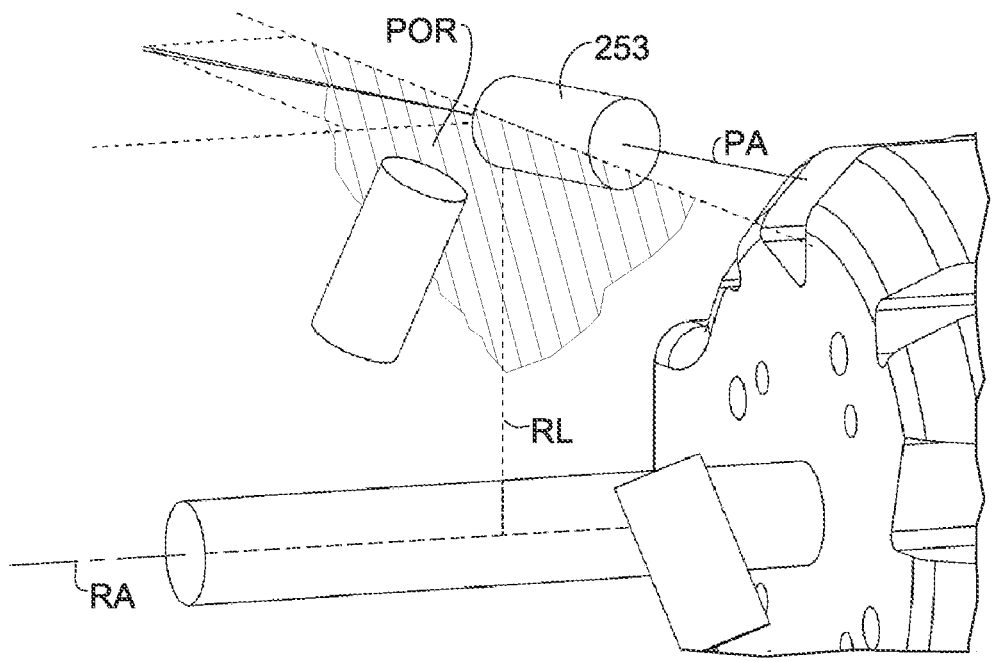
FIG. 17(d) corresponds to FIG. 17(c) and highlights the plane of rotation.

Referring in particular to FIGS. 17(b), 17(c) and 17(d), the plane of rotation POR can be regarded as an imaginary plane nominally orthogonal to the rotor axis RA and intersecting the hub element 215 at an axial location (along the rotor axis RA) corresponding to one of the two brackets 252 (or one end of the respective pin 253) of each of the rotor blades 220, for example. Such an inclination for each pivot axis PA can be defined with reference to a first respective angle $\varphi$ and a second respective angle $\delta$ of the respective pivot axis PA, as follows. The first respective angle $\varphi$ and the second respective angle $\delta$ lie on mutually orthogonal planes—referred to herein as the first reference plane and the second reference plane, respectively.

Figure 17E:
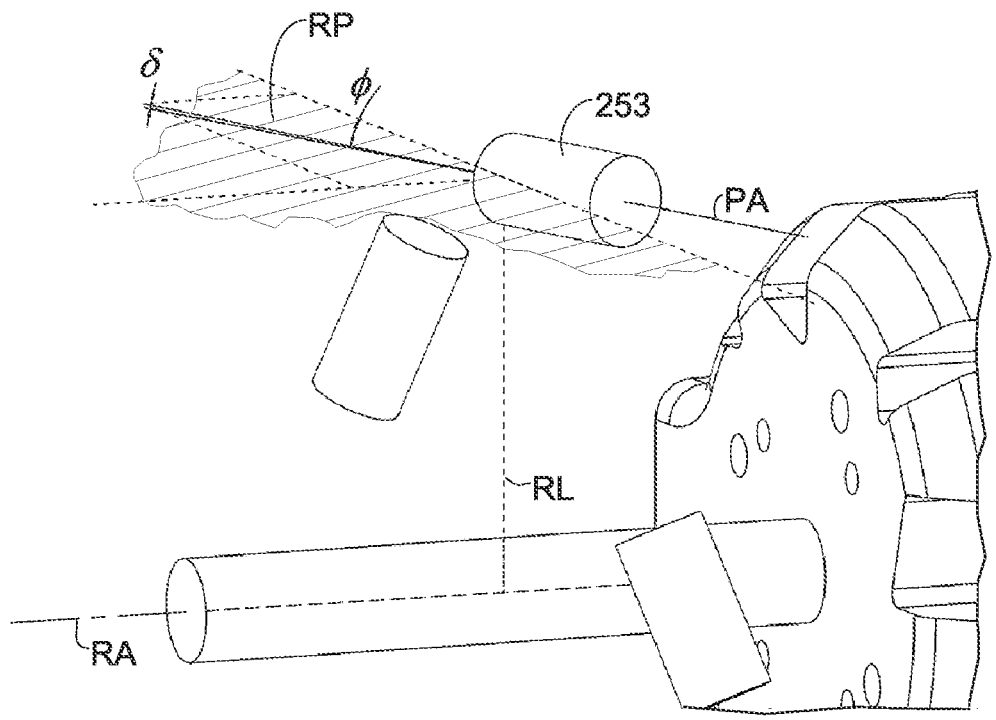
FIG. 17(e) corresponds to FIG. 17(c) and highlights the reference plane corresponding to one pivot plane.

The first angle $\varphi$ is taken along the respective first reference plane RP (see also FIG. 17(e)), the first reference plane RP being the plane of rotation POR and concurrently orthogonal to an imaginary respective radial line RL along said plane of rotation POR, and wherein the respective pivot axis PA also lies on the respective first reference plane RP. Each respective radial line RL projects radially outwards from the rotor axis RA.

The second angle $\delta$ is taken along a second reference plane orthogonal to the respective first reference plane RP (see also FIG. 17(c) and FIG. 17(e)). The second reference plane is concurrently at angle $\varphi$ to the plane of rotation POR.

In at least this example, propulsion system 10 is configured with the rotor arrangement 200 forward of the nacelle 300.

Referring in particular to FIGS. 1(a), 2(a), 3(a) and 4(a), in the deployed configuration DC, the blade tips 220T of the rotor blades 220 are spaced radially furthermost from the rotor axis RA. In this configuration the rotor arrangement can be turned about the rotation axis RA via the drive unit 230. Rotation of the rotor arrangement 200 about the rotor axis RA by the drive unit generates a forward thrust, thereby providing propulsive power.

Referring to FIGS. 1(b), 2(b), 3(b) and 4(b), in the undeployed configuration UC, the rotor blades 220 are folded towards the nacelle 300 such that the blade tips 220T of the rotor blades 220 are spaced furthermost axially away from the rotor hub 215 in a direction parallel to the rotor axis RA. In this configuration the rotor arrangement 200 can be locked with respect to rotation about the rotation axis RA. In this configuration, the propulsion system 10 generates less drag at any forward speed, as compared with the deployed configuration DC, and does not generate any propulsive power.

In at least this example, the rotor arrangement 200 is a propeller arrangement, in particular a fixed pitch propeller arrangement. However, in alternative variations of this example, the rotor arrangement 200 can instead comprises a variable pitch propeller arrangement, which can optimize the pitch angle for various parts of the flight envelope, for example at different rotation rates, different altitudes, different flight speeds, and so on, in which the variable pitch capability can be at discrete pitch angles, or continuously variable. Furthermore, such variable pitch capability can optionally include negative pitch angles, for example for providing thrust reversal. In such cases, the rotor arrangement is further configured to provide a baseline pitch angle consistent with enabling the rotor blades to attain the required undeployed configuration UC.

Figure 5C:
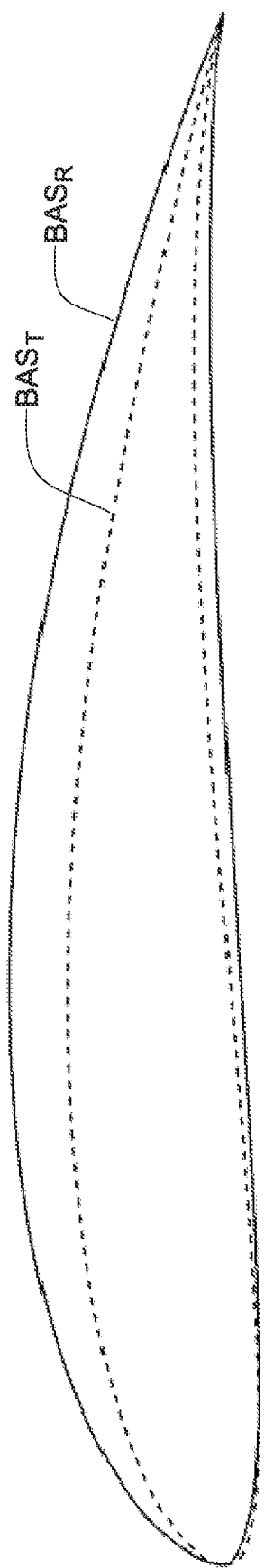
FIG. 5(c) shows transverse cross-sectional views of a tip aerofoil section and a root aerofoil section of the example of FIG. 5(b) in superposition and normalized to have the same chord length.

In at least this example, and referring also to FIG. 5(a), FIG. 5(b) and FIG. 5(c), the rotor blades 220 are each in the form of propeller blades, each rotor blade 220 having a blade root 220R, a blade tip 220T, blade leading edge 220L, blade trailing edge 220E, and a plurality of blade aerofoil sections BAS extending between the blade root 220R and the blade tip 220T along the length LB of the rotor blade 200. Each rotor blade 220 also comprises a blade pressure surface 220P extending between the blade leading edge 220L and the blade trailing edge 220E, and a blade suction surface 220S extending between the blade leading edge 220L and the blade trailing edge 220E.

In at least this example, the rotor blades 220 incorporate a twist, such that the twist angle β (between the respective chord and the disc plane of rotation) of the respective blade aerofoil sections BAS decreases from the blade root 220R to the blade tip 220T.

In at least this example, and referring particularly to FIG. 5(c), the rotor blades 220 incorporate a variable thickness to chord ratio, such that the thickness to chord ratio of the respective blade aerofoil sections BAS decreases from that of the respective blade aerofoil sections $BAS_R$ at the blade root 220R, to that of the respective blade aerofoil sections $BAS_T$ at the blade tip 220T.

Optionally, the blades 220 can have a forward sweep.

Figure 15A:
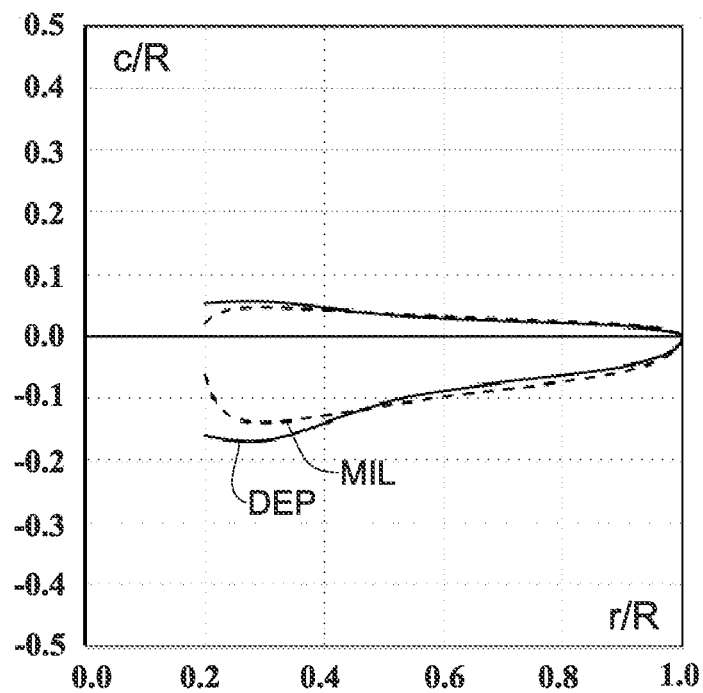
FIG. 15(a) schematically illustrates distribution of chord length with radial location of the rotor blades for the example of FIG. 1(a)
Figure 15B:
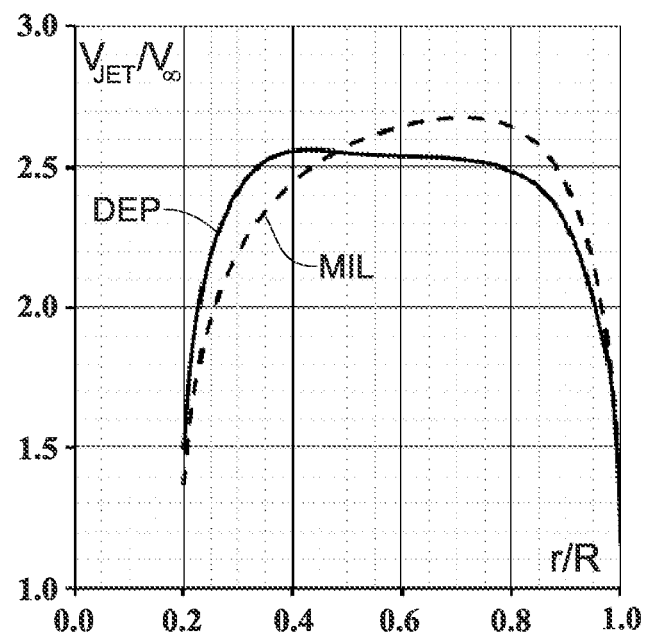
FIG. 15(b) schematically illustrates an example of jet velocity distribution with radial location along rotor blades of the example of FIG. 15(a)
Figure 15C:
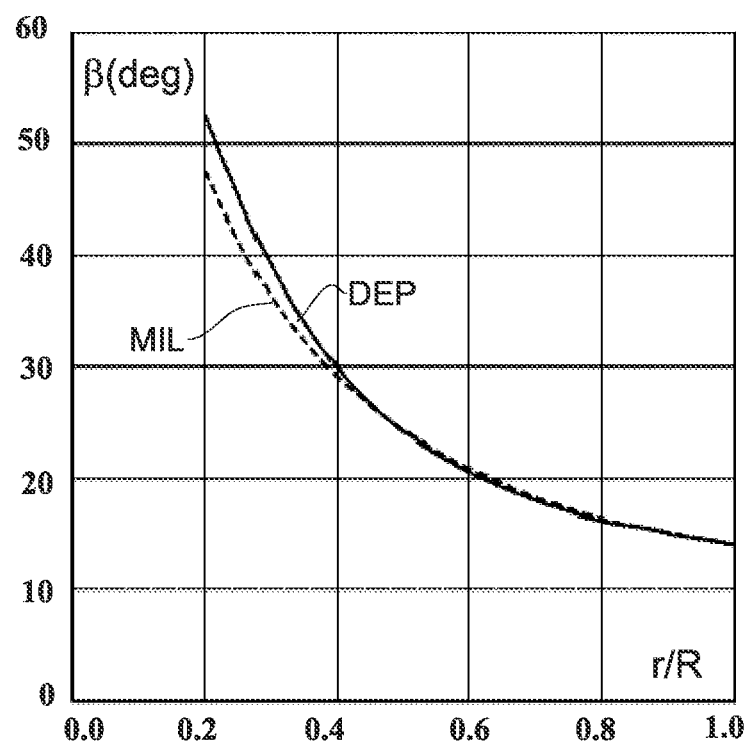
FIG. 15(c) schematically illustrates an example of rotor blade twist angle with radial location along rotor blades of the example of FIG. 15(a).

Referring also to FIG. 15(a), FIGS. 15(b) and 15(c), in at least this example, the rotor blades 220 (referred to as "DEP" in these figures) are optimized for generating uniform slipstream rather than for providing high efficiency for a desired thrust. For a given desired average axial induced velocity, the DEP rotor blades can provide less thrust and consume less power as compared with the equivalent MIL (minimum induced losses) rotor blades.

As illustrated in FIG. 15(c), a MIL profile of induced axial velocity at the plane of rotation POR of the rotor vs. radial location from the blade root to the blade tip provides a peak jet velocity outboard of the radial midpoint position on the blade. Thus, the majority of the average jet velocity $V_J$ is contributed to by the outboard half of the rotor blade. Such a MIL rotor blade has a relative smooth distribution of chord length vs radial location from the blade root to the blade tip, as illustrated in FIG. 15(a).

In contrast, and referring again to FIG. 15(a), the DEP rotor blades 220, at least according to this example, have a much larger chord length at the root 220R than the MIL rotor blade, and the chord length quickly reduces to less than that of the MIL rotor blade at radial locations of about 40% till the blade tip. Furthermore, the chord length at the blade root 220R in the DEP rotor blade 220 can be about double than at the 50% radial location. This blade profile for rotor blade 220 provides a damping profile of induced axial velocity downstream of the rotor vs. radial location from the blade root 220R to the blade tip 220T. Thus, the majority of the average jet velocity $V_J$ is contributed to by the inboard half of the rotor blade 220.

Induced jet velocity $V_{induced}$ is the local increase in jet velocity at the rotor location. This is related to the jet velocity $V_{jet}$ (downstream of the rotor) and the freestream velocity Vo by the expression:

$$V_{jet} = V_\infty + 2 \cdot V_{induced}$$

In alternative variations of this example, the respective rotor blades can instead be optimized as MIL (minimum induced losses) rotor blades.

Referring again also to FIGS. 5(a), 5(b), 5(c), and as mentioned above, in at least this example, the rotor blades 220 incorporate a twist, such that the twist angle ß (between the respective chord and the disc plane of rotation) of the respective blade aerofoil sections BAS decreases from the blade root 220R to the blade tip 220T. FIG. 15(c) illustrates the distribution of twist angle β with radial location along the DEP rotor blades 220, and compares this distribution with a corresponding distribution obtained with a MIL rotor blade.

Furthermore, and referring again to FIG. 5(c), the distribution of thickness to chord ratio with radial location along the DEP rotor blades 220 is such that the thickness to chord ratio is at a maximum at the blade root 220R and a minimum at the blade tip 220T, thereby providing a more rounded external profile at or near the blade root 220R, for example as compared with a MIL rotor blade. Similarly, the camber of the blade aerofoil sections BAS can optionally also be reduced from the blade root 220R to the blade tip 220T, thereby providing a more rounded external profile at or near the blade root 220R, for example as compared with a MIL rotor blade. Providing a more rounded external profile at or near the blade root 220R, can be useful in the undeployed configuration UC.

Figure 6A:
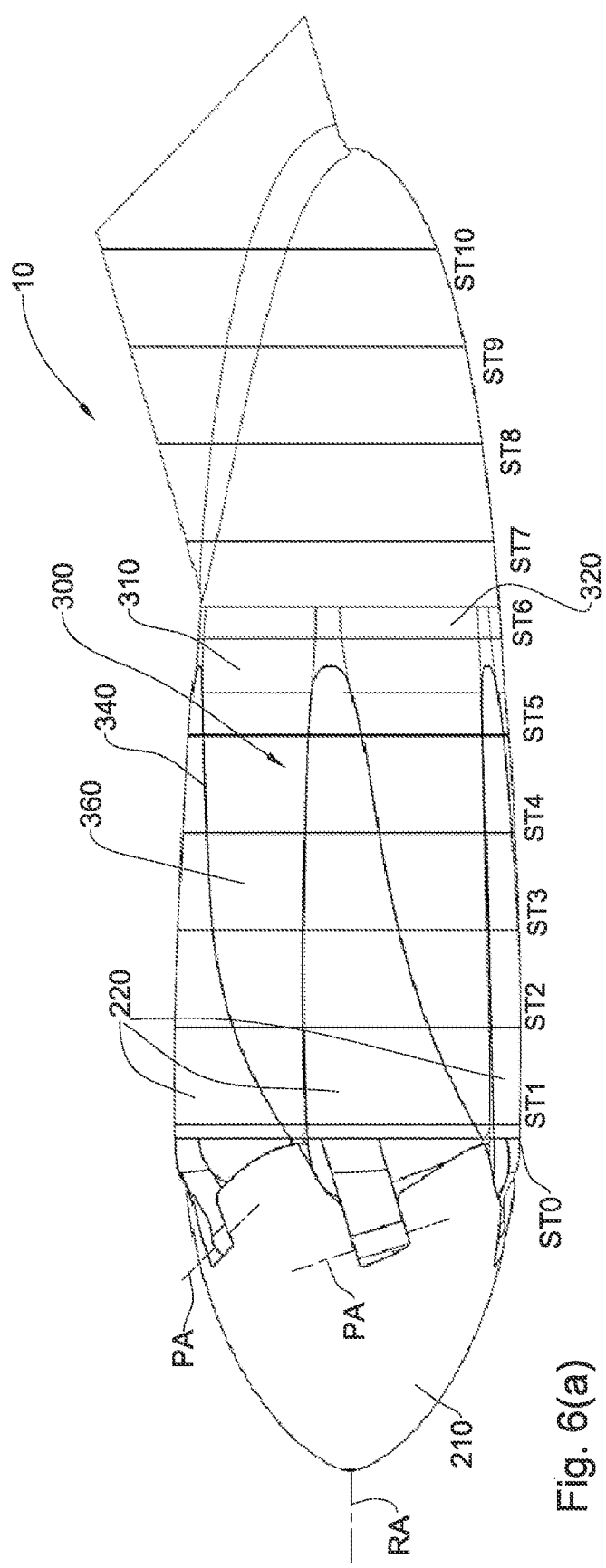
FIG. 6(a) is a side view of the example of FIG. 1(a) in undeployed configuration.
Figure 6B:
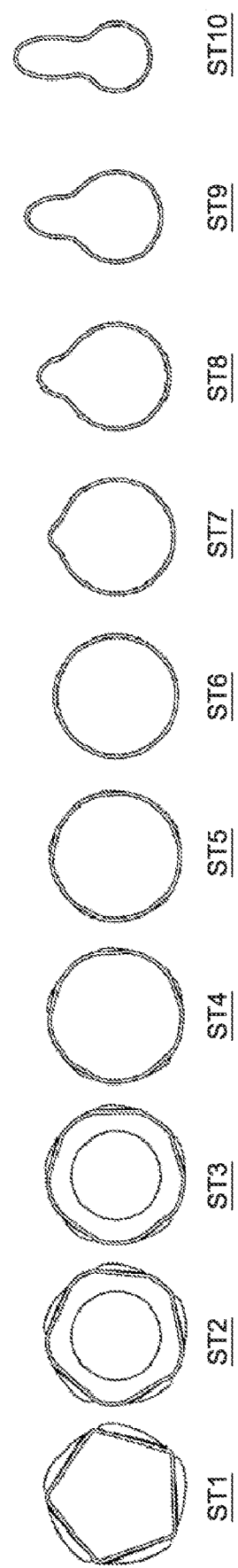
FIG. 6(b) is a series of transverse cross-sectional views of a plurality of longitudinal stations defined with respect to the example of FIG. 6(a).
Figure 7:
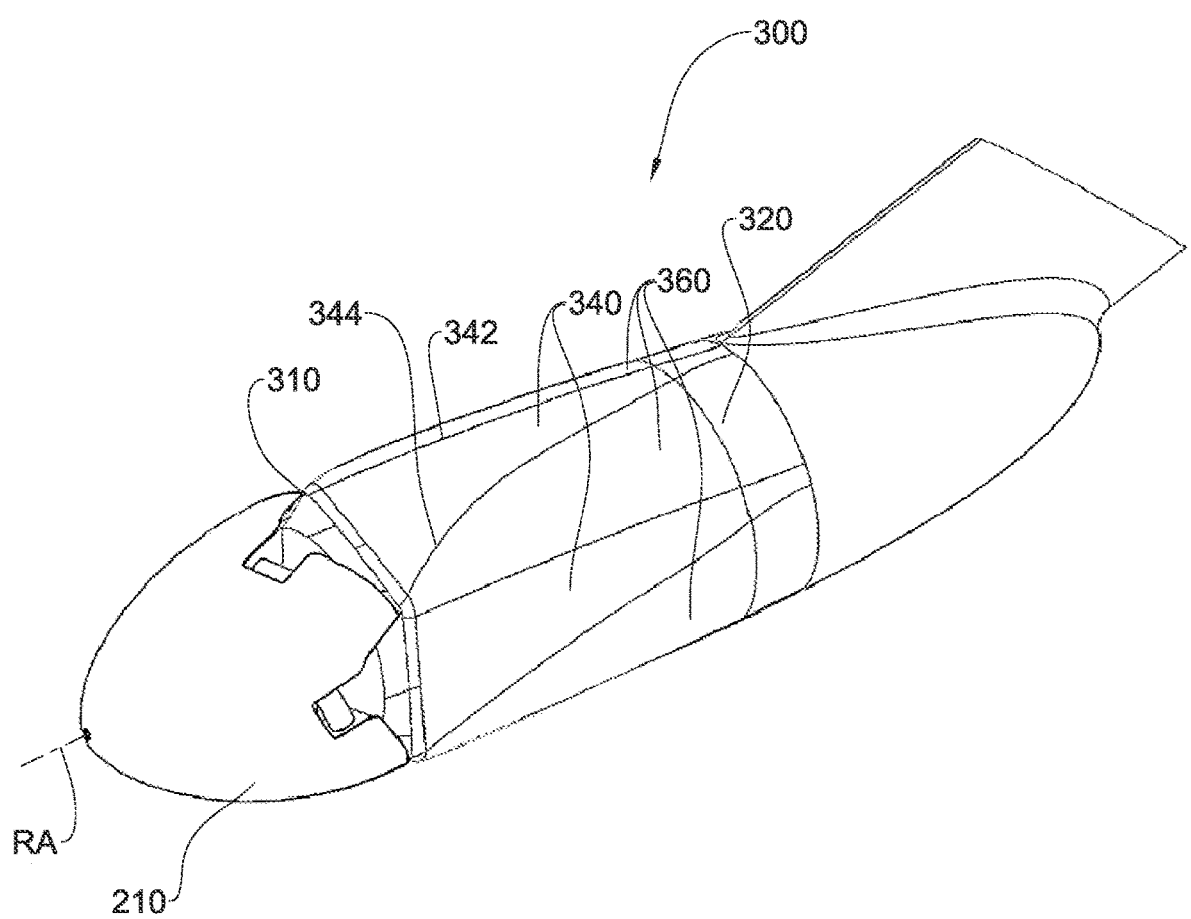
FIG. 7 is an isometric view of nacelle of the example of FIG. 1(a).

Referring also to FIGS. 6(a), 6(b) and 7, the nacelle 300 comprises a nacelle body 310 having a nacelle outer surface 320.

The nacelle outer surface 320 comprises a plurality of facet elements 340 and a plurality of transition elements 360.

As will become clearer herein the facet elements 340 are configured for enabling the blades 220 to be in concurrent overlying relationship with the respective facet elements 340 when in undeployed configuration UC.

The facet elements 340 extend aft from the hub element 215, and each adjacent pair of facet elements 340 is circumferentially spaced from one another by a corresponding transition element 360.

The transition elements 360 are each geometrically contoured to provide a smooth geometrical transition between adjacent facet elements 340, and thus provide a non-discontinuous geometrical transition between adjacent facet elements 360.

In other words, there are no significant geometrical discontinuities between one facet element 340 and an adjacent facet element 340, as bridged by a respective transition element 360.

In at least this example, there are the same number of facet elements 340 as rotor blades 220. Thus, in this example in which the rotor arrangement 200 comprises five rotor blades 220, the nacelle 300 also comprises also comprises five facet elements 340, and thus also five transition elements 360.

However, it is to be noted that in alternative variations of this example, the nacelle 300 can include a greater number of facet elements 340 than there are rotor blades 220 in the rotor arrangement 200. For example, the number of facet elements 340 can be an integer multiple of the number of rotor blades 220, for example the number of facet elements 340 can be two times, or three times the number of rotor blades 220.

Figure 8:
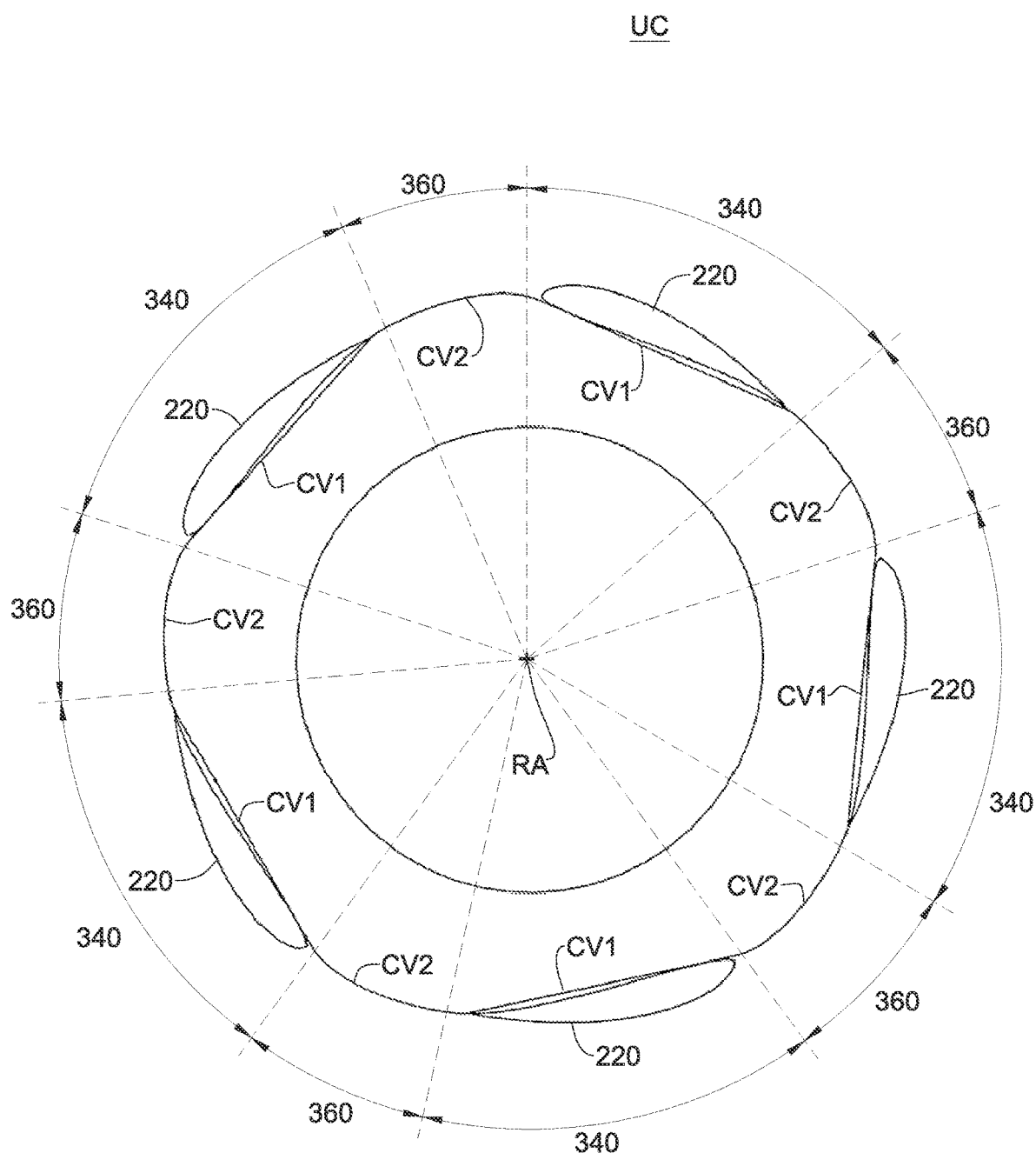
FIG. 8 is a transverse cross-sectional view of a forward longitudinal station (station ST2) defined with respect to the example of FIG. 6(a).

According to an aspect of the presently disclosed subject matter, and referring also to FIG. 8, in the undeployed configuration UC, each rotor blade 220 is in overlying and fully external relationship with respect to a corresponding facet element 340. By "fully external relationship" is meant that no part of the rotor blade 220 is recessed into any part of the nacelle outer surface 320. In other words, each one of the rotor blades 220 is, in the undeployed configuration UC, in a non-recessed spatial relationship with respect to the nacelle outer surface 320, and in particular with respect to the respective facet element 340 regarding which the respective rotor blade 220 is in overlying relationship with.

Also according to an aspect of the presently disclosed subject matter, and as illustrated in FIG. 8, each facet element 340 has a first curvature CV1 with respect to the rotor axis RA, and each transition element 360 has a second curvature CV2 with respect to the rotor axis RA, wherein the first curvature CV1 is different from the second curvature CV2.

In at least this example, the first curvature CV1 of the facet elements 340 is significantly less in magnitude than the second curvature CV2 of the transition elements 360.

Clearly, the nacelle body 310, and the nacelle outer surface 320, are each non-axisymmetric, particularly with respect to the rotor axis RA.

Also in at least this example, the first curvature CV1 is non-circular, in particular with respect to the rotor axis RA. In other words, at least the facet elements 340 have transverse cross-sectional profiles that are non-circular, or that are not respective arcs of a circle, for example centered on the rotor axis RA.

FIG. 6(*b*) illustrates a number of exemplary transverse cross-sectional profiles of the nacelle 300, and of the rotor blades 220 in the undeployed configuration UC, taken at various longitudinal stations ST1, ST2, ST3, ST4, ST5, ST6, ST7, ST8, ST9 with respect to the rotor axis RA as marked in FIG. 6(*a*). It is to be noted that FIG. 5(*a*) and FIG. 5(*b*) illustrate blade aerofoil sections BAS corresponding to the longitudinal stations ST1, ST2, ST3, ST4, ST5. In at least this example, in the undeployed configuration UC, each rotor blade 220 is in overlying relationship with respect to the nacelle 300, in particular with respect to the corresponding facet element 340 such that the respective rotor blade tips 220T are located at or just aft of longitudinal station ST5.

Figure 9:
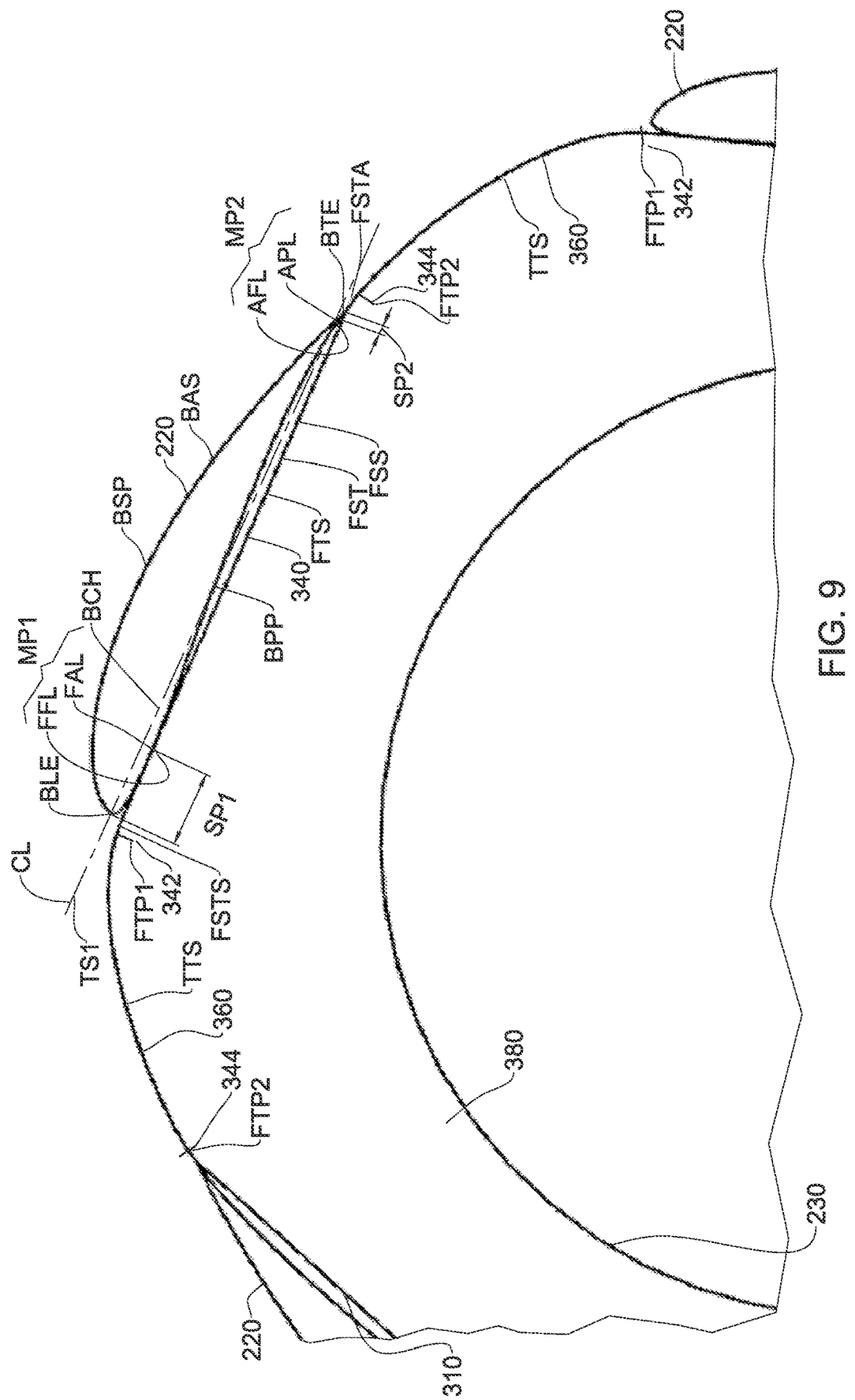
FIG. 9 is a detail transverse cross-sectional view of a portion of the example of FIG. 8.

By way of example, FIG. 9 shows part of the second longitudinal stations ST2, including inter alia one facet element 340, one transition element 360 on either side of the facet element 340, and the transverse cross-section of the corresponding blade aerofoil section BAS corresponding to the second longitudinal stations ST2.

As with all the other blade aerofoil sections BAS of each rotor blade 220, the blade aerofoil section BAS illustrated in FIG. 9 comprises a respective aerofoil leading edge BLE (corresponding to the trailing edge 220E of the rotor blade 220), a respective aerofoil trailing edge BTE (corresponding to the leading edge 220L of the rotor blade 220), a respective aerofoil chord BCH, a respective aerofoil suction surface profile BSP (corresponding to the suction surface 220S of the rotor blade 220), and a respective aerofoil pressure surface profile BPP (corresponding to the pressure surface 220P of the rotor blade 220).

An aerofoil chord line CL can be defined as being co-aligned with respective aerofoil chord BCH, and extending past the respective aerofoil leading edge BLE in one direction, and past the respective aerofoil trailing edge BTE in the opposed direction.

As with all the other blade aerofoil sections BAS of each rotor blade 220, in the undeployed configuration UC the blade aerofoil section BAS illustrated in FIG. 9 has the respective pressure surface profile BPP facing and in abutting contact with, or at a minimum proximity with respect to, a corresponding facet transverse section FTS of the respective facet element 340, in at least one of a first matching point MP1 and a second matching point MP2.

In the first matching point MP1 a respective first forward aerofoil location FAL and a corresponding respective first facet section location FFL on the corresponding facet transverse section FTS of the respective facet element 340, are in abutting contact or are at a minimum spacing with respect to one another.

In the second matching point MP2, a respective aft aerofoil location AAL and a corresponding respective second facet section location AFL on said corresponding facet transverse section FTS of the respective facet element 340, are in abutting contact or are at a minimum spacing with respect to one another.

In at least this example, the transverse width of the respective facet element 340, and thus the transverse width of the respective facet transverse sections FTS, varies in an aft direction parallel to the rotor axis RA. This variation is in the same manner as the variation in blade chord BCH from blade root 220R to blade tip 220T. For example, the transverse width of the respective facet element 340, and thus the transverse width of the respective facet transverse sections FTS, can decrease in an aft direction parallel to the rotor axis RA, for example from station ST1 and aft, or from station ST2 and aft.

For example, each facet element 340 can be defined between a respective first transverse facet edge 342 and a respective second transverse facet edge 344. The respective first transverse facet edge 342 can be at or close to the location of the respective blade leading edge 220L of the respective rotor blade 220 (in undeployed configuration UC), and the respective second transverse facet edge 344 can be at or close to the location of the respective blade trailing edge 220E of the respective rotor blade 220 (in undeployed configuration UC).

Thus, in the undeployed configuration UC illustrated in FIG. 6(*a*) for example, each rotor blade 220 is exactly overlying the respective facet element 340.

At each longitudinal station, each facet transverse section FTS is joined to each of the respective two transition transverse sections TTS adjacent thereto at a respective first facet/transition point FTP1 and at a respective second facet/transition point FTP2. The locus of the respective first facet/transition point FTP1 for a particular facet element 340 defines the respective first transverse facet edge 342, and the locus of the respective second facet/transition point FTP2 for the facet element 340 defines the respective second transverse facet edge 344.

For each facet transverse section FTS corresponding to a facet element 340, the respective first facet/transition point FTP1 and the respective second facet/transition point FTP2 define therebetween a respective major facet section segment FST along the respective facet transverse section FTS.

In at least this example, the first forward aerofoil location FAL is aft of the respective aerofoil leading edge BLE by a first spacing SP1. For example, the first spacing SP1 can be in the range of zero to 35% of the respective aerofoil chord BCH.

In at least this example, the first aft aerofoil location AAL is forward of the respective aerofoil trailing edge BTE by a second spacing SP2. For example, the second spacing SP2 can be in the range of zero to 35% of the respective aerofoil chord BCH.

For each facet transverse section FTS corresponding to a facet element 340, the respective first facet section location FFL and the respective second facet section location AFL define therebetween a respective minor facet section segment FSS each said minor facet section segment FSS being in facing relationship with the respective aerofoil pressure surface profile BPP of the respective blade aerofoil sections BAS of the respective rotor blade 220 when in the undeployed configuration.

Each minor facet section segment FSS is thus fully contained within the respective major facet section segment FST.

In alternative variations of this example, the minor facet section segment FSS fully coincides with the respective major facet section segment FST, and thus the first facet/transition point FTP1 for a particular facet element 340 is located in the same position as the respective first matching point MP1, thereby defining the respective first transverse facet edge 342, and the locus of the respective second facet/transition point FTP2 for a particular facet element 340 is located in the same position as the respective second matching point MP2, thereby defining the respective second transverse facet edge 344.

In at least this example, no part of each respective transition transverse section TTS is concave—for example, and as can be seen in FIG. 9, each respective transition transverse section TTS is convex.

In at least this example, no part of each respective facet transverse section FTS is concave—for example, and as can be seen in FIG. 9, each respective facet transverse section TTS is flat.

For example, in at least this example, the respective minor facet section segment FSS, and optionally also the respective major facet section segment FST, has a respective facet segment curvature that is non-circular. For example, such a facet segment curvature is less than a curvature of an imaginary circle arc having center at rotor axis RA and intersecting at least one of the respective first facet section location FFL and the respective second facet section location AFL.

In at least this example, the respective facet segment curvatures for each facet element 340 is zero, and thus the corresponding minor facet section segment FSS and optionally the respective major facet section segment FST are nominally rectilinear.

In alternative variations of this example, the respective facet segment curvatures for the respective minor facet section segment FSS and optionally the respective major facet section segment FST are nominally conformal to the respective aerofoil pressure surface profile BPP of the respective blade aerofoil sections BAS of the respective rotor blade 220 (i.e., a part of the respective aerofoil pressure surface profile BPP between the respective first matching point MP1 and the respective second matching point MP2) when in the undeployed configuration.

It is to be noted that in at least one alternative variation of this example, the respective facet segment curvatures for each facet element 340 is zero, and the respective transition segment curvatures for each transition element 360 is also zero. For example, the facet elements 340 and the transition elements 360 can all be nominally flat.

Referring again to FIG. 9, for each facet element 340, a forward part FSTF of the respective major facet section segment FST is defined between the respective first matching point MP1 (or the respective first facet section location FFL) and the adjacent first facet/transition point FTP1. Similarly, an aft part FSTA of the respective major facet section segment FST is defined between the respective second matching point MP2 (or the respective second facet section location AFL) and the adjacent second facet/transition point FTP2.

For example, "fully external relationship" can be understood to relate to at least the first matching point MP1 in one or more of the following ways.

For example, and in at least this example, in the undeployed configuration UC, the respective transition transverse section TTS of each adjacent transition element 360 with respect to the facet transverse section FTS of the adjacent respective facet element 340, wholly lies on a first transverse side TS1 of the respective chord line CL. It is to be noted that the first transverse side TS1 further includes at least a part of the respective aerofoil pressure surface profile BPP extending aft of the respective aerofoil leading edge BLE. Similarly, and in at least this example, in the undeployed configuration UC, the respective forward part FSTF of the respective major facet section segment FST, wholly lies on a first transverse side TS1 of the respective chord line CL.

In other words, no portion of the respective transition transverse section TTS of each of the transition elements 360, or of the forward part FSTF of the respective facet elements 340, projects outwardly in a radial direction (from the rotation axis RA) past the respective blade leading edge BLE in the immediate vicinity of the respective blade leading edge BLE. Similarly, no portion of the part of the respective facet transverse section FTS of each of the transition elements 360 that is forward of the respective first matching point MP1, i.e., the respective forward part FSTF, projects outwardly in a radial direction (from the rotation axis RA) past the respective blade leading edge BLE in the immediate vicinity of the respective blade leading edge BLE.

Additionally or alternatively, for example, and also in at least this example, referring to FIG. 9(a), "fully external relationship" can be understood as follows. A respective rectilinear first line L1 can be defined parallel to the respective chord line CL and tangential to or intersecting the first matching point MP1. In the undeployed configuration UC, the respective transition transverse section TTS of each adjacent transition element 360 with respect to the facet transverse section FTS of the adjacent respective facet element 340, wholly lies on a first transverse side TS1' of the respective first line L1. It is to be noted that the first transverse side TS1' further includes at least a part of the respective aerofoil pressure surface profile BPP extending aft of the respective aerofoil leading edge BLE. Similarly, and in at least this example, in the undeployed configuration UC, the respective forward part FSTF of the respective major facet section segment FST, wholly lies on the first transverse side TS1' of the respective first line L1.

Additionally or alternatively, for example, and also in at least this example, referring to FIG. 9(b), "fully external relationship" can be understood as follows. A respective rectilinear second line L2 can be defined joining the first matching point MP1 and the second matching point MP2. In the undeployed configuration UC, the respective transition transverse section TTS of each adjacent transition element 360 with respect to the facet transverse section FTS of the adjacent respective facet element 340, wholly lies on a first transverse side TS1" of the respective second line L2. It is to be noted that the first transverse side TS1" further includes at least a part of the respective aerofoil pressure surface profile BPP extending aft of the respective aerofoil leading edge BLE. Similarly, and in at least this example, in the undeployed configuration UC, the respective forward part FSTF of the respective major facet section segment FST, wholly lies on the first transverse side TS1" of the respective second line L2.

Additionally or alternatively, for example, and also in at least this example, referring to FIG. 9(c), "fully external relationship" can be understood as follows. A respective rectilinear third line L3 can be defined joining any pair of points P1, P2, wherein each of the points P1 and P2 is defined anywhere on a forward part FSTF of the respective major facet section segment FST, or anywhere on an adjacent respective transition transverse section TTS that is forward of, and joined to, the aforesaid respective forward part FSTF. It is to be noted that such a respective third line L3 wholly lies outside of any part of the blade aerofoil section BAS of the respective rotor blade 220 in the undeployed configuration. In other words, such a respective third line L3 does not intersect any part of the blade aerofoil section BAS of the respective rotor blade 220 in the undeployed configuration.

Additionally or alternatively, for example, and also in at least this example, referring to FIG. 9(d), "fully external relationship" can be understood as follows. A respective rectilinear fourth line L4 can be defined joining any pair of points P1', P2', wherein each of the points P1' and P2' is defined anywhere on a respective facet transverse section FTS, or anywhere on an adjacent respective transition transverse section TTS. It is to be noted that such a respective fourth line L4 wholly lies outside of any part of the blade aerofoil section BAS of the respective rotor blade 220 in the undeployed configuration. In other words, such a respective fourth line L4 does not intersect any part of the blade aerofoil section BAS of the respective rotor blade 220 in the undeployed configuration.

Figure 10:
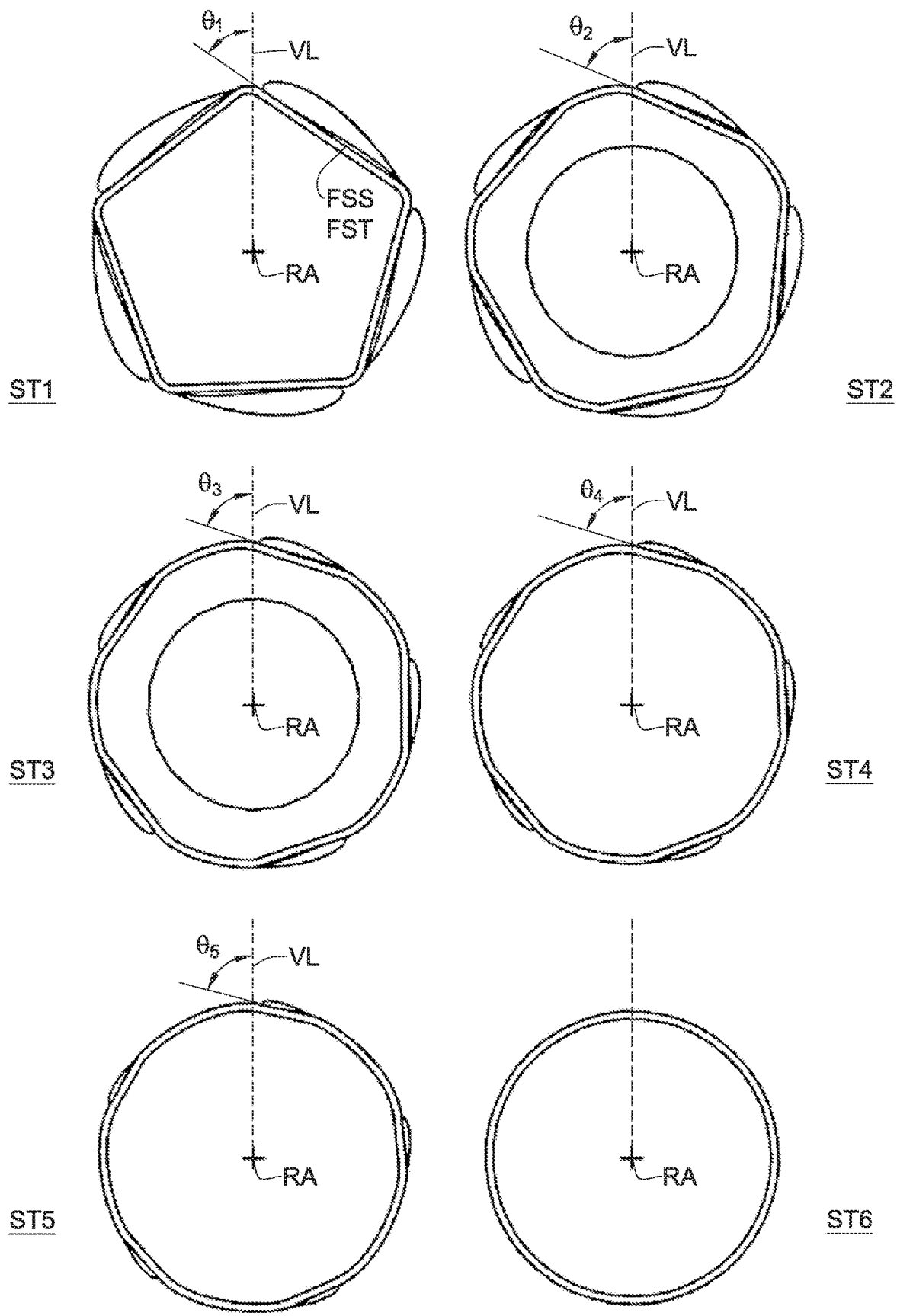
FIG. 10 is a series of transverse cross-sectional views of a plurality of longitudinal stations defined with respect to the example of FIG. 6(a), illustrating change of orientation of the respective minor facet section segment FSS corresponding thereto.

Referring to FIG. 10, the angular orientation θ of the respective minor facet section segment FSS (and optionally of the respective major facet section segment FST), for example with respect to an imaginary datum (vertical) line VL, at each facet transverse section FTS corresponding to a facet element 340 changes along an aft direction parallel to the rotor axis RA. Thus, the angular orientation θ1 corresponding to the first longitudinal station ST1 increases to θ2 at station ST2, then increases to θ3 at station ST3, then increases to θ4 at station ST4, and then increases again to θ5 at station ST5. The change in the angular orientation θ along the rotor axis RA corresponds to change in the twist angle β of the respective rotor blade 220 from blade root 220R to blade tip 220T (in the undeployed configuration UD).

In other words, the respective minor facet section segment FSS (and optionally of the respective major facet section segment FST) of the facet transverse sections FTS corresponding to a facet element 340 define a generally helical or spiral surface for the respective fact element.

In at least this example, and as can be understood from the above, a first transverse width W1 of the facet transverse section FTS (i.e., corresponding to the major facet section segment FST) varies (for example decreases) in an aft direction parallel to the rotor axis RA, in a similar manner to the variation in the blade chord BCH from blade root 220R to blade tip 220T for the respective blade aerofoil sections BAS of the respective rotor blade 220 when in the undeployed configuration. This feature is illustrated in FIG. 11, in which the magnitude of the respective first transverse widths W1 progressively decreases from longitudinal station ST1 to longitudinal station ST5.

Concurrently, however, in at least this example a second transverse width W2 of the respective transition transverse sections TTS also changes (for example increases) relative to the respective first transverse width W1 of the facet transverse section FTS. Thus, the magnitude of the respective second transverse widths W2 progressively varies (for example increases) from longitudinal station ST1 to longitudinal station ST5.

Figure 11:
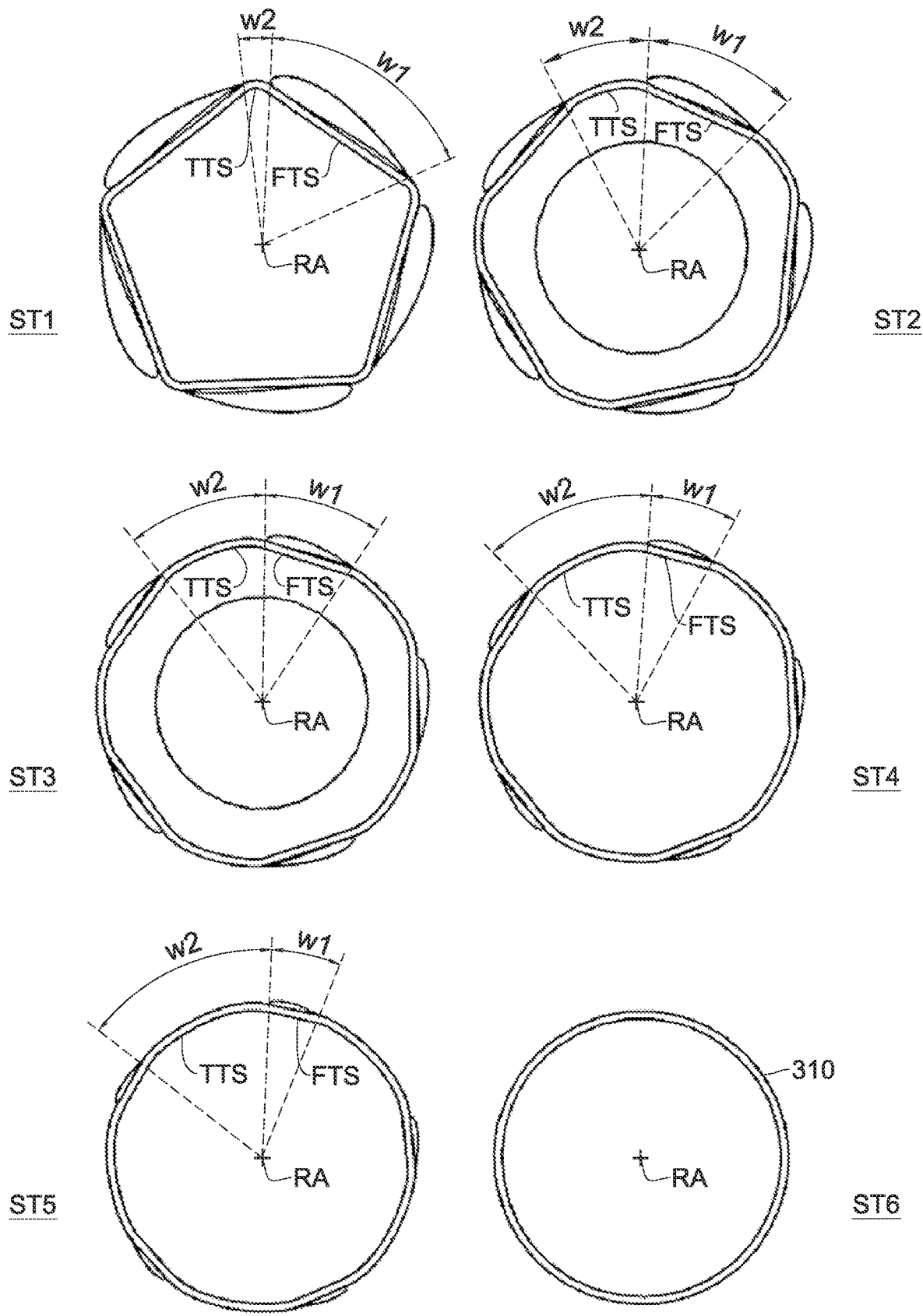
FIG. 11 is a series of transverse cross-sectional views of a plurality of longitudinal stations defined with respect to the example of FIG. 6(a), illustrating changes in the respective first transverse width of the facet transverse section and changes in the second transverse width of the respective transition transverse sections corresponding thereto.
Figure 13:
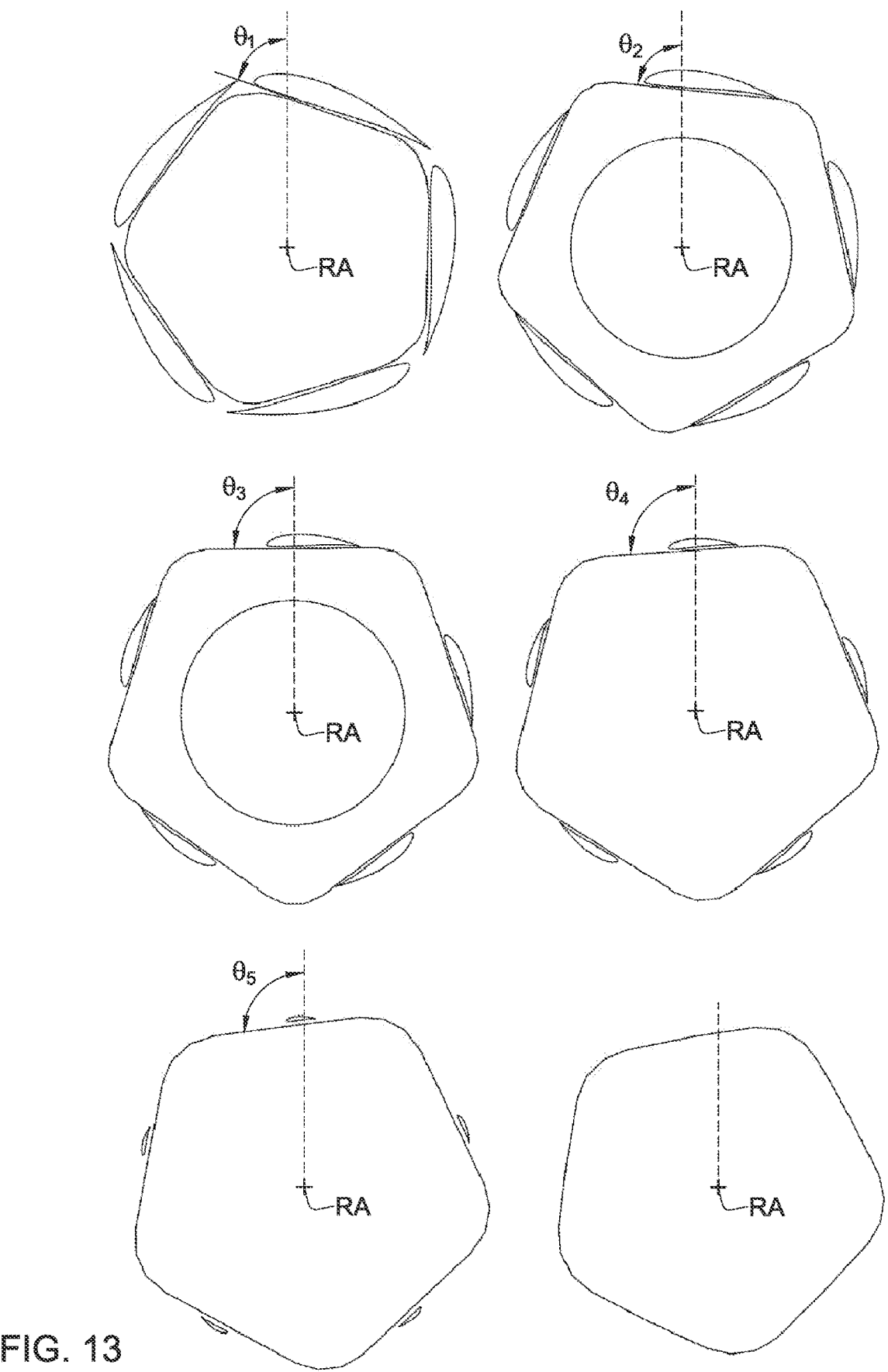
FIG. 13 is a series of transverse cross-sectional views of a plurality of longitudinal stations defined with respect to the example of FIG. 12(a), illustrating change of orientation of the respective minor facet section segment FSS corresponding thereto.
Figure 14:
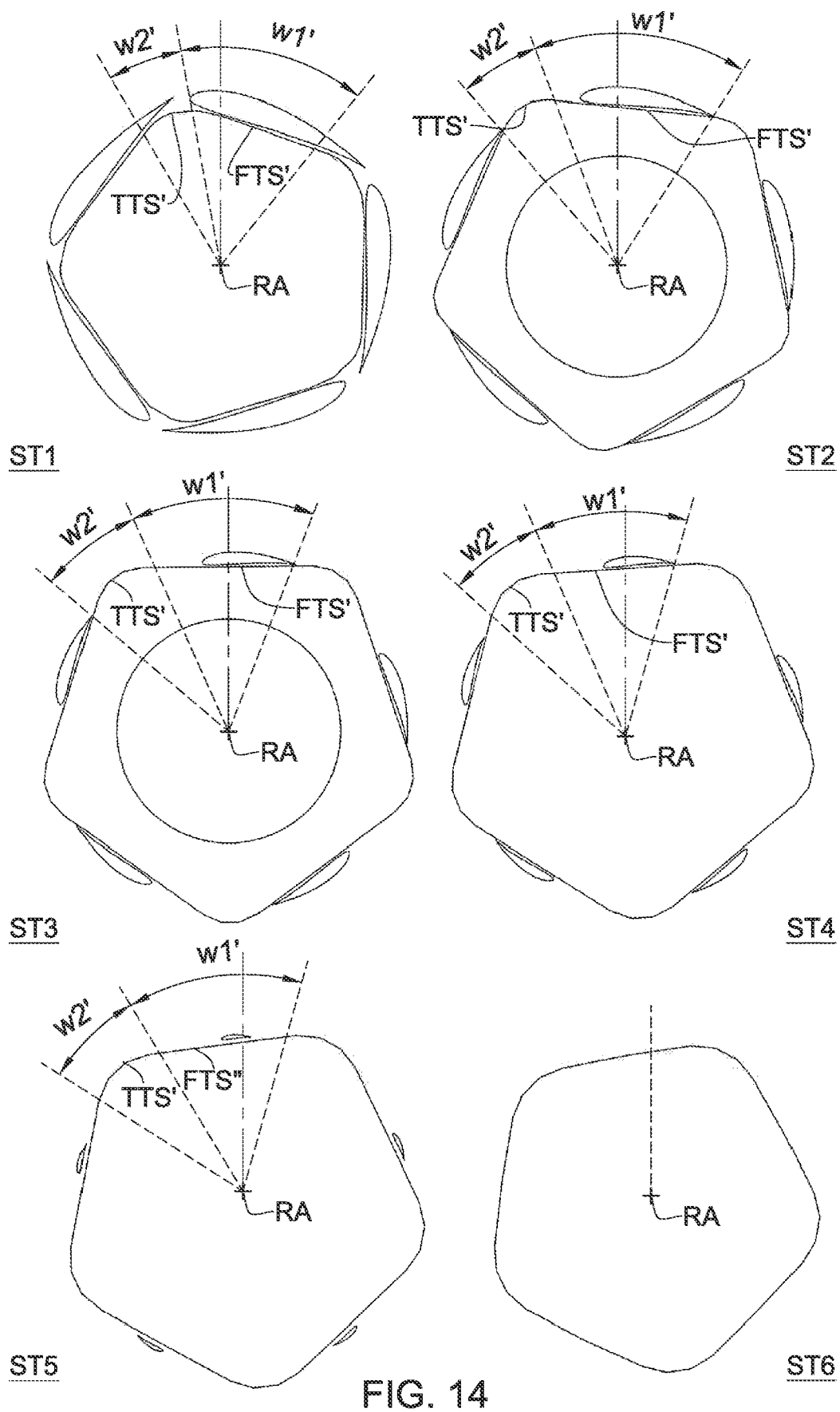
FIG. 14 is a series of transverse cross-sectional views of a plurality of longitudinal stations defined with respect to the example of FIG. 12(a), illustrating changes in the respective first transverse width of the facet transverse section and changes in the second transverse width of the respective transition transverse sections corresponding thereto.

Furthermore, in at least this example, the contour of respective transition transverse sections TTS changes in an aft direction parallel to the rotor axis RA, becoming more and more circular, so that at longitudinal station ST6 the nacelle outer surface 310 has a generally circular transverse cross-section, as can be seen in FIGS. 10 and 11, for example.

Thus, in at least this example, and referring again to FIG. 6(b) in particular, the transverse cross-sections at each of the longitudinal stations ST1 to at least ST6 morph from a generally polygonal cross section (in this example, a general pentagonal cross section), with rounded corners corresponding to the respective transition transverse sections TTS', to a general circular or other rounded cross-section for example at station ST6.

According to an aspect of the presently disclosed subject matter, the propulsion unit 10, in particular the respective rotor arrangement 200, can be operated to transit from the undeployed configuration UC to the deployed configuration DC in a passive manner.

This can be accomplished, for example, by spinning the rotor arrangement 200 about the rotor axis RA, such that centrifugal forces thus generated deploy the rotor blades 220 to the deployed configuration DC. Without being bound to theory, inventors consider that the non-recessed configuration of the rotor blades 220, and the profiles of the facet elements 340 and the transition elements 360, allow and facilitate such passive deployment.

Figure 18A:
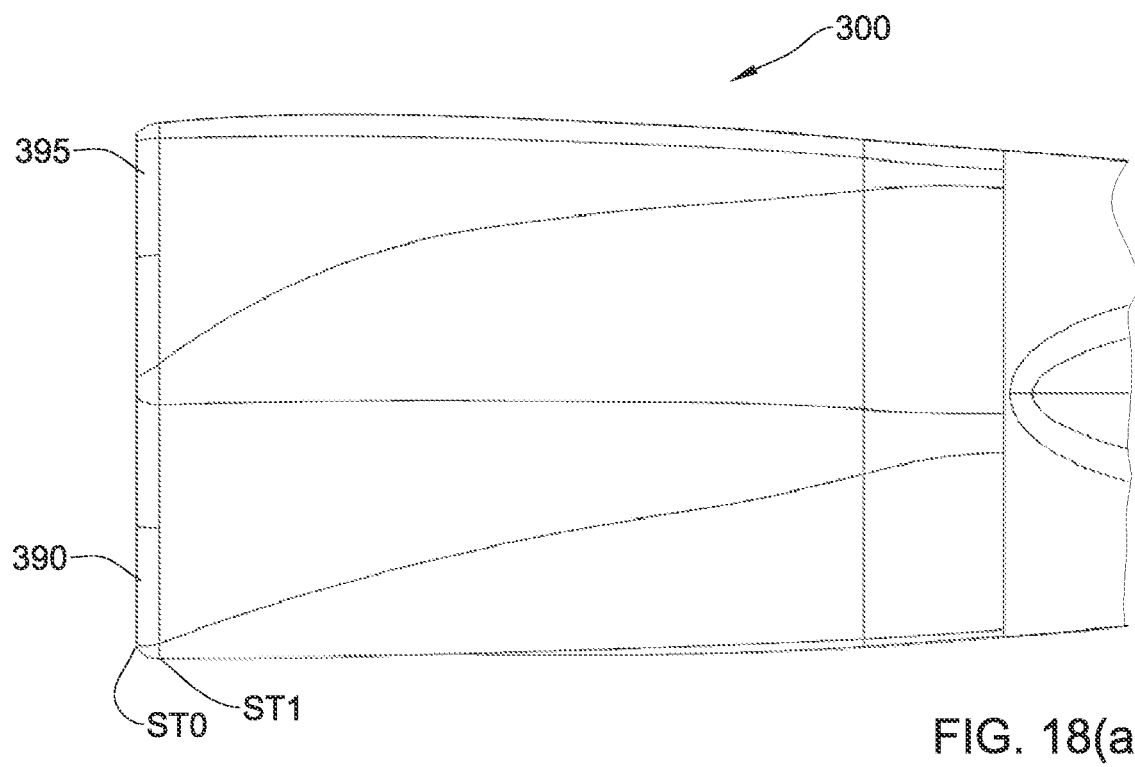
FIG. 18(a) is a top view of the nacelle of the example of FIG. 1.
Figure 18B:
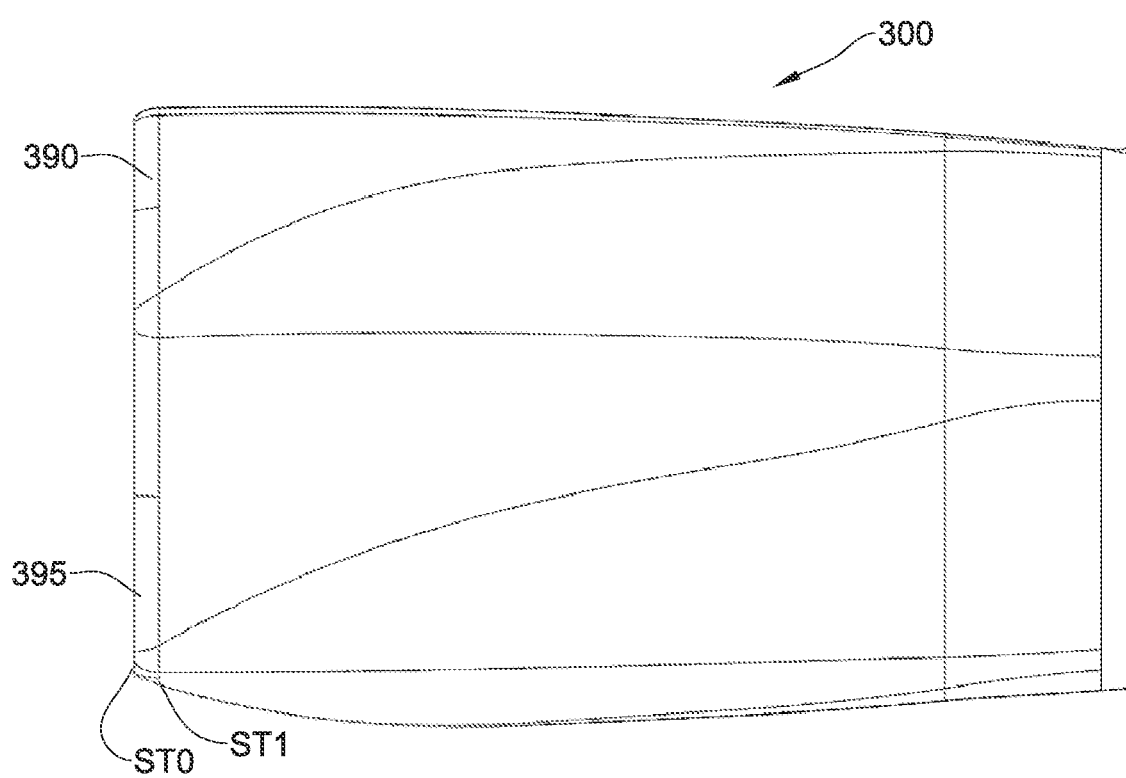
FIG. 18(b) is a side view of the example of FIG. 18(a)
Figure 18C:
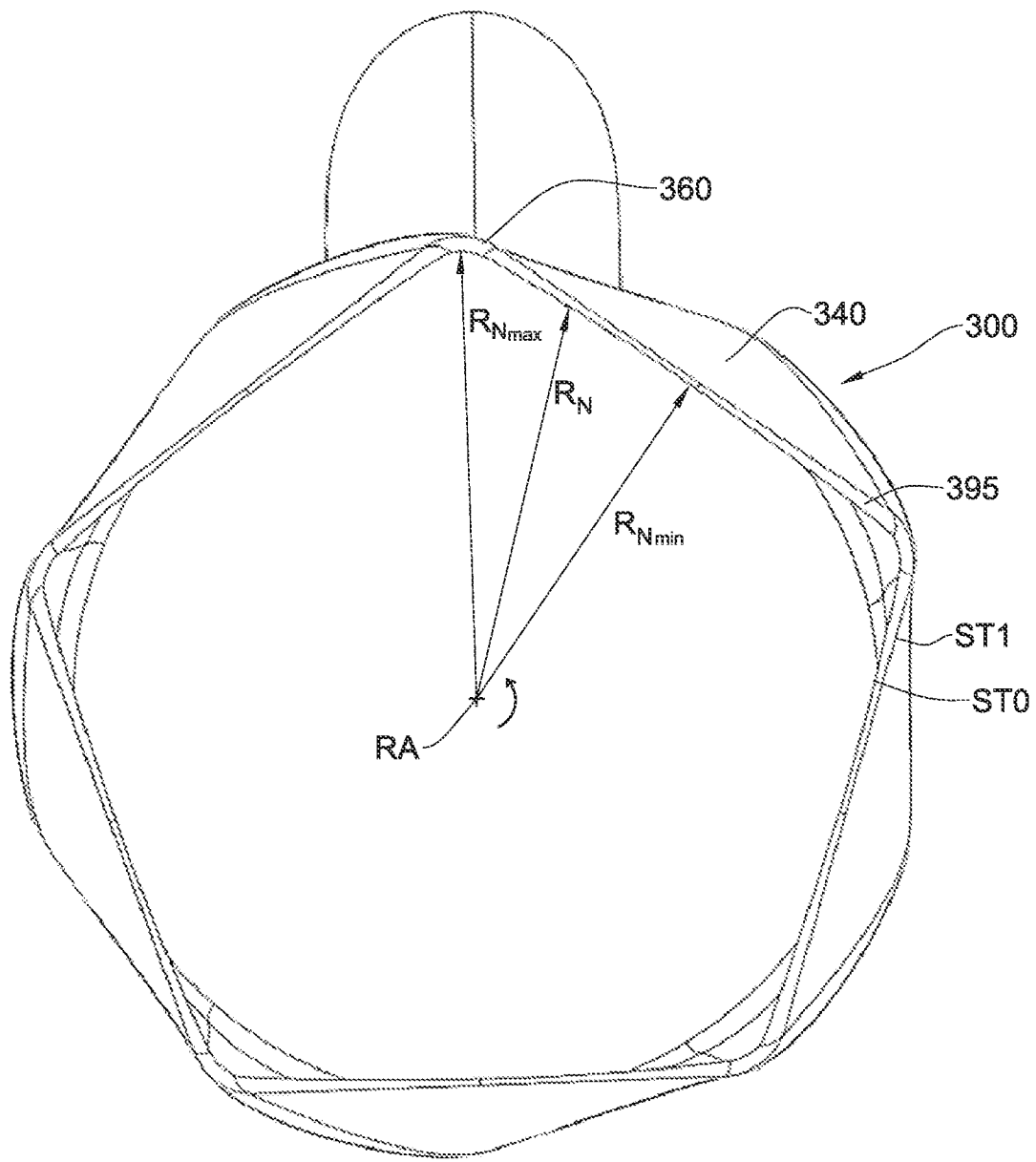
FIG. 18(c) is a front view of the example of FIG. 18(a).

In particular, and referring also to FIGS. 18(a), 18(b), 18(c), in at least this example, the first station ST1 is spaced aft from the front edge 390 (also referred to herein as station ST0) of the nacelle 300 by a relatively small axial spacing. The cross-sectional profile of the front edge 390 (station ST0) is similar in shape, but dimensionally smaller than the cross-sectional profile of the first station ST1.

The front edge 390 is joined to the first station ST1 via a peripheral rounded lip 395. The convexly rounded lip 395 has curvuate cross-sections along planes that are radially projecting from the rotor axis RA. The curvature of such curvuate cross-sections can be of the same order as the leading edge of the rotor blade aerofoil sections BAS at or near the rotor blade root 220R, for example of the root blade aerofoil section $BAS_R$.

Referring again to FIG. 5(a), it is to be noted that the blade aerofoil sections BAS of the rotor blade 220 extend towards the rotor blade root 220R, up to the root blade aerofoil section $BAS_R$, corresponding to and in overlying relationship with (in the unemployed configuration UC) with station ST0. The axial spacing between stations ST0 and ST1 can also be in the order of the leading edge radius of the root blade aerofoil section $BAS_R$.

Referring in particular to FIG. 18(c), in view of the generally polygonal shape of the nacelle transverse cross-sections at least at stations ST0 and ST1, the radial spacing RN between the nacelle outer surface 320 and the rotor axis RA cyclically varies in a circumferential direction around the rotor axis RA. The radial spacing RN reaches a maximum value $R_{Nmax}$ at a corresponding central portion of each transition element 360, and a minimum value $R_{Nmin}$ at a corresponding general central portion of each facet element 340.

Figure 19A:
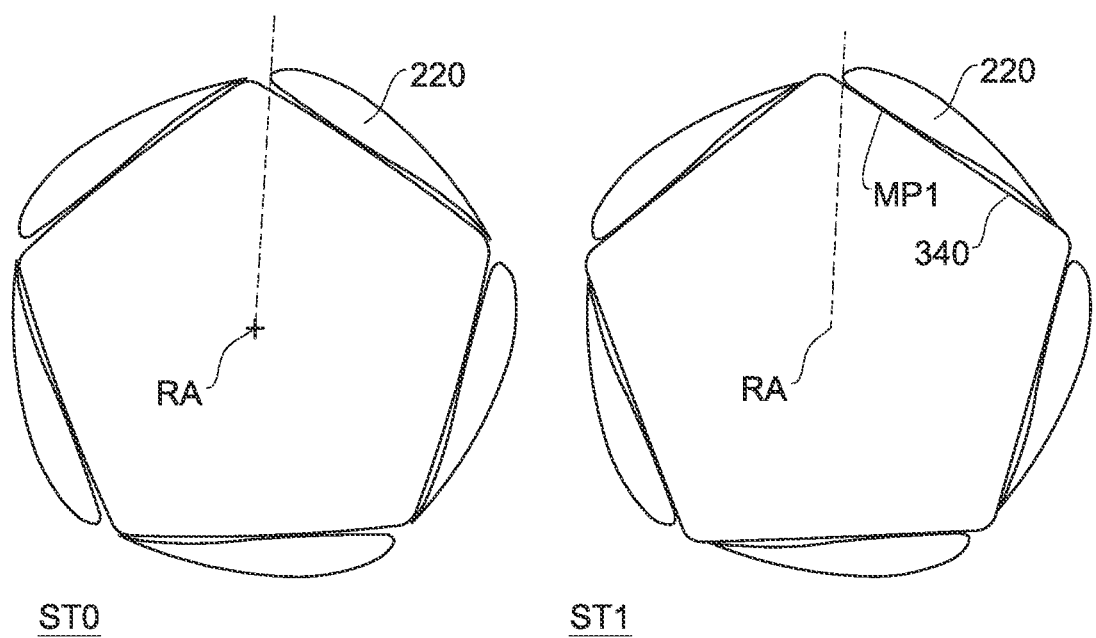
FIG. 19(a) is a transverse cross-sectional view of each one of stations ST0 and ST1 of the example of FIG. 6(a) and FIG. 6(b) in undeployed configuration.

Thus, with the rotor blade 220 in undeployed configuration, the rotor blade is in abutment with the respective facet element 340 at least at the respective station ST1, for example as illustrated in FIG. 19(a). Such abutment is at least at the first matching point MP1.

Figure 19B:
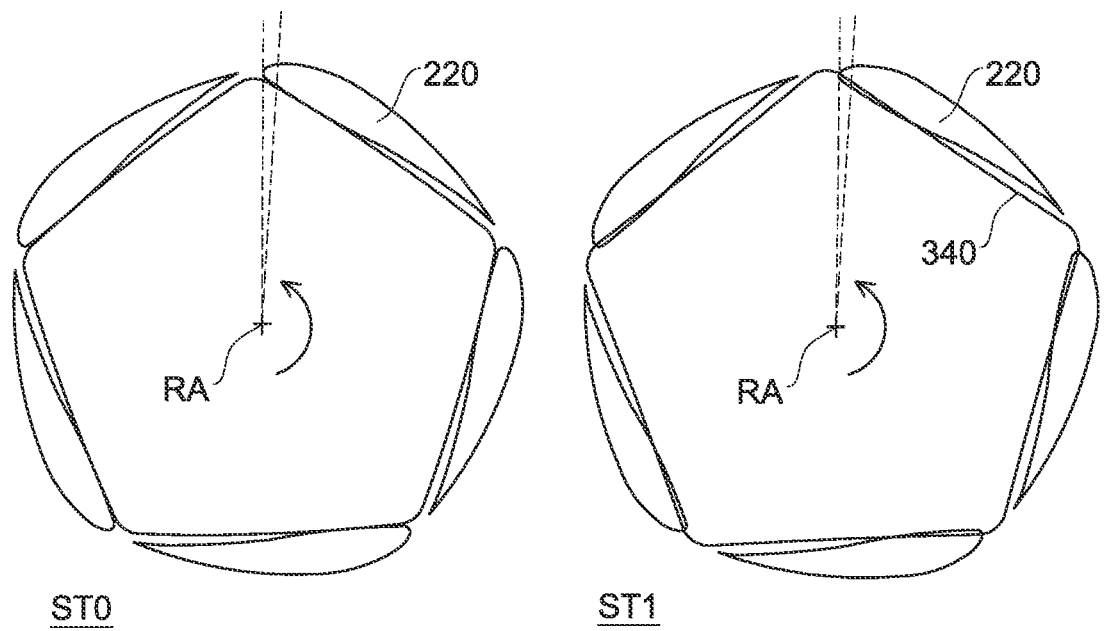
FIG. 19(b) is a transverse cross-sectional view of each one of stations ST0 and ST1 of the example of FIG. 19(a) after the rotor arrangement has rotated about 3° about the rotor axis.

As the rotor arrangement 200 begins to turn from the undeployed configuration (counterclockwise, as seem in FIGS. 19(a) and 19(b)), each facet element appears to the respective overlying moving rotor blade 220 as an upwardly inclined slope. As the rotor blade 220 moves circumferentially it overlies a different the part of the facet element 340 and the first matching point MP1 essentially moves circumferentially towards the respective transition element 360, and concurrently the radial spacing Rx is increasing. Thus, as the blade 220 is forced by the relatively "ramped" profile of the facet element 340 to increase its spacing from the rotor axis RA on account of the increasing radial spacing Rx, and in view of the fact the that rotor blade is pivotably mounted to the rotor hub 215, the blade 220 can only move in the available degree of freedom in order to satisfy these conditions. This available degree of freedom is pivoting movement about the respective pivot axis PA, thereby moving the blade 220 away from the undeployed configuration UC.

FIG. 19(b) illustrates schematically the theoretical position at station ST1 of blade 220 if the blade 220 were not allowed to pivot, while rotating about the rotor axis RA by about 3° from the undeployed configuration—essentially intersecting the respective facet element 340, which in practice cannot happen—rather, the blade 220 instead pivots outwardly towards the deployed configuration DC.

In at least this example, with the rotor blade 220 in undeployed configuration, each rotor blade 220 is not in abutment with the respective facet element 340 at the respective station ST0, but rather in close spaced relationship, for example as illustrated in FIG. 19(a). However, as the rotor arrangement 200 rotates about the rotor axis RA, the rotor blade 220 does contact a part of the rounded lip 395 in close proximity to or at the transition element 360. This part of the rounded lip 395 also appears as a "ramp" to the corresponding part of the rotor blade, and moreover the rounded form of the rounded lip 395 essentially facilitates the rotor blade 220 to start/continue to pivot outwardly.

FIG. 19(a) and FIG. 19(b) illustrate schematically the theoretical position of station ST0 of blade 220, while rotating about the rotor axis RA by about 3° from the undeployed configuration UC.

Once the rotor blades 220 have begun to pivot about the respective pivot axes PA, the centrifugal forces generated by the rotor blades 220 as the rotor arrangement 200 spins cause the rotor blades to fully deploy to the deployed configuration DC.

In at least this example, the rotor blades 220 are maintained in the deployed configuration so long as the rotor arrangement 200 is spinning about the rotor axis at or higher than a threshold speed such that the centrifugal forces maintain the rotor blades in deployed configuration.

Thus, in at least this example, there is no need for an active deployment system, for example including springs and the likes, for deploying the rotor blades 220.

Furthermore, the propulsion unit 10, in particular the respective rotor arrangement 200, can operate to transit from the deployed configuration DC to the undeployed configuration UC when the rotor arrangement 200 is no longer driven by the drive unit 230. For example, in at least some modes of operation, the respective rotor arrangement 200, naturally transits from the deployed configuration DC to the undeployed configuration UC (and the rotor arrangement 200 is no longer spinning under the action of the drive unit and as the rotational velocity of the rotor arrangement 200 is decreased to zero) under the action of aerodynamic drag forces.

Thus, when electrical power to the drive unit 230 is stopped, the rotor arrangement 200 rotates slower until it eventually spins at less than the threshold speed, and thereafter the blades 220 begin to pivot in an aft direction towards the undeployed configuration UC. Optionally an active system can be provided for facilitating transition to the undeployed configuration, for example springs.

It is to be noted that in the undeployed configuration UC the rotor arrangement 200 is allowed to come to a complete rotational stop only at certain circumferential positions about the rotor axis RA, such as to ensure that the rotor blades 220 are aligned with, and thus capable of overlying, the respective facet elements 340. For example, the rotor arrangement can be allowed to partially pivot towards the undeployed configuration UC, and then to continue slowly rotating until the abovementioned circumferential locations are reached, thereafter, the rotor is stopped and locked, and the rotor blades are fully pivoted to the undeployed configuration. A suitable damping mechanism can be provided to avoid or minimize vibration or impact of the blade with respect to the respective facets.

A suitable mechanical and/or electrical arrangement can be provided for this purpose. For example, a suitable sensor arrangement can be provided to determine the position of the rotor blades 220, and this sensor arrangement can be coupled, for example, with ESC 240 to enable the rotor arrangement 200 to slowly despin and eventually stop at the desired relative positions with respect to the facet elements 360, via a suitable electronic position control (EPC) system.

Thus, a suitable synchronization and locking mechanism (not shown) can be provided for ensuring that the rotor arrangement 200 stops at a circumferential orientation such that the blades 220 are in overlying position with the facet elements 340, and then locked in position. Thus, for example, the ESC 240 (or another controller) can monitor the circumferential position of the hub element 215 (for example via suitable sensors), and only allows the rotor arrangement 200 to stop when the hub element 215 is in a position corresponding to the blades 220 are in overlying position with the facet elements 340. Since in this example there are five facet elements and five rotor blades, there are five possible positions for the hub element 215 to stop while rotating about the rotor axis RA and ensure that blades 220 are in overlying position with the facet elements 340.

Thus, the stowing procedure for the blades 220 from the deployed configuration DC to the undeployed configuration UC has two steps—a pivoting step in which the blades 220 are allowed to pivot from the deployed configuration to close to their positions in the undeployed configuration, and a stopping and locking step that locks and stops the rotor arrangement 200 such that the blades 220 are stopped and locked in overlying position with the respective facet elements 340. The stopping and locking step can thus include a minor final pivoting of the rotor blades 20 about the respective pivot axes PA.

Optionally, magnets, biasing springs, and/or an alternative active or passive locking arrangement can be provided for locking the rotor arrangement in the undeployed configuration UC so long as the drive unit is not active, i.e., not spinning the rotor arrangement 200.

Additionally or alternatively, the drive unit 230 can be configured for braking such that the drive shaft 232 stops and remains locked at a particular angular position with respect to the rotor axis RA, for example via an internal magnetic system. Such an angular position can be set to correspond to a position at which the rotor blades 220 are in overlying position over the respective facets in the undeployed configuration UD.

Optionally, the nacelle 300 can be configured to allow for ventilation of the drive unit 230 at least when the rotor arrangement 200 is in deployed configuration.

Referring again to FIG. 9, the drive unit 230 is spaced from the nacelle body 310 by a channel 380 that circumferentially and axillary envelopes the drive unit 230. This channel allows cooling air (from the atmosphere) to pass therethrough and thereby cool the drive unit 230.

Such atmospheric cooling air can enter the nacelle 300 and into the channel 380 via the hub element 215 and/or via the spacing between the hub element 215 and the front edge 390 of the nacelle 300.

The cooling air can exit the channel 380 and nacelle 300 via suitable nacelle outlets. For example, such outlets can be provided in the outer skin of the nacelle 300.

Figure 20A:
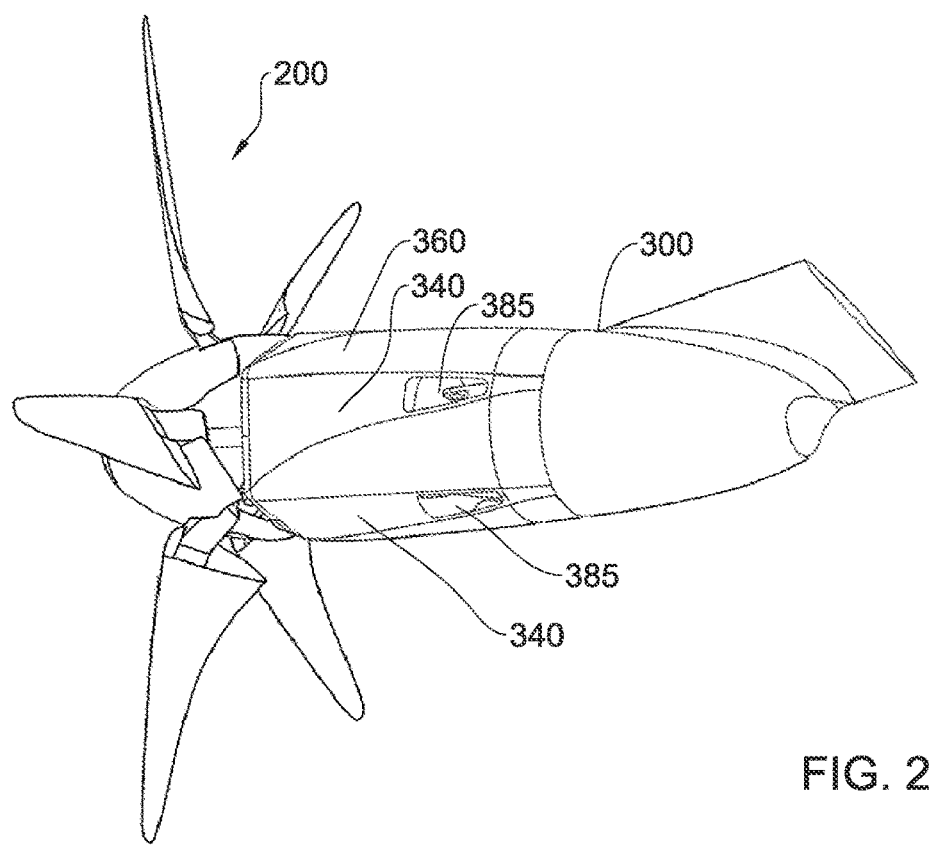
FIG. 20(a) is an aft isometric view of the example of FIG. 1, including optional modifications for ventilating air flow.
Figure 20B:
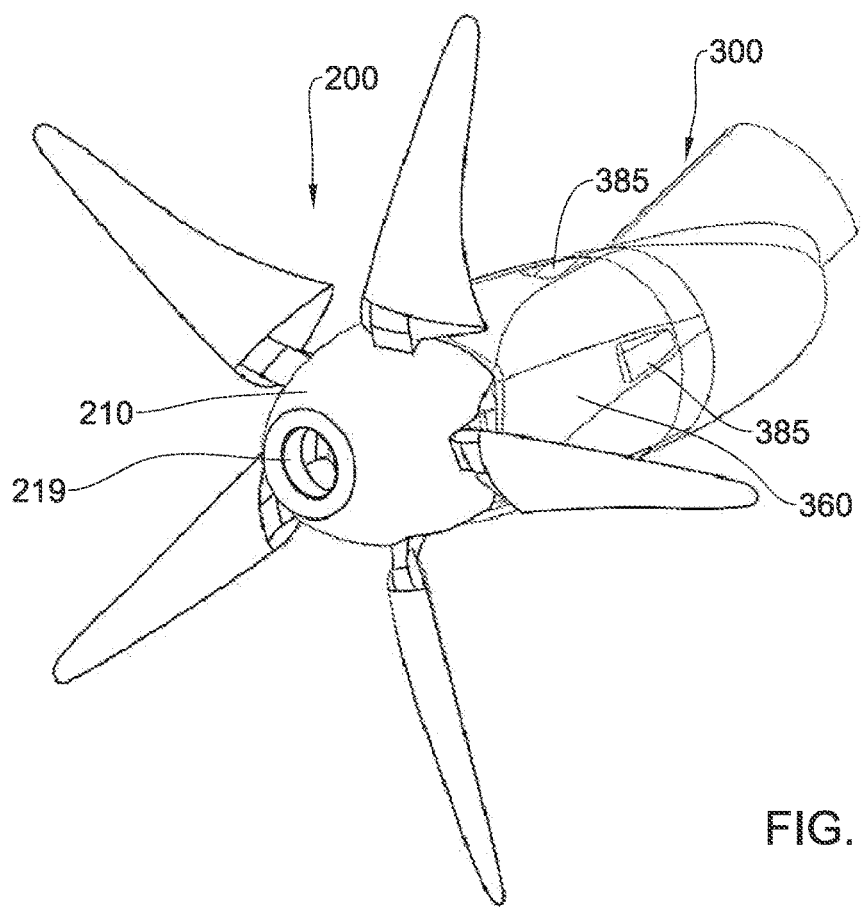
FIG. 20(b) is a front isometric view of the example of FIG. 20(a).

For example, and referring to FIGS. 20(*a*) and 20(*b*), such outlets can be in the form of slots 385 formed in the facet elements 340, the slots 385 being in free fluid communication with the channel 380.

Optionally, and referring again to FIGS. 20(*a*) and 20(*b*), the fairing 210 can be modified to include a ram air inlet 219, and the rotor hub 215 can comprise through-openings 211 (see FIGS. 16(*a*) and 16(*b*)) that allow free axial flow of atmospheric air through the fairing 210 and hub 215 and into the channel 380.

Figure 21A:
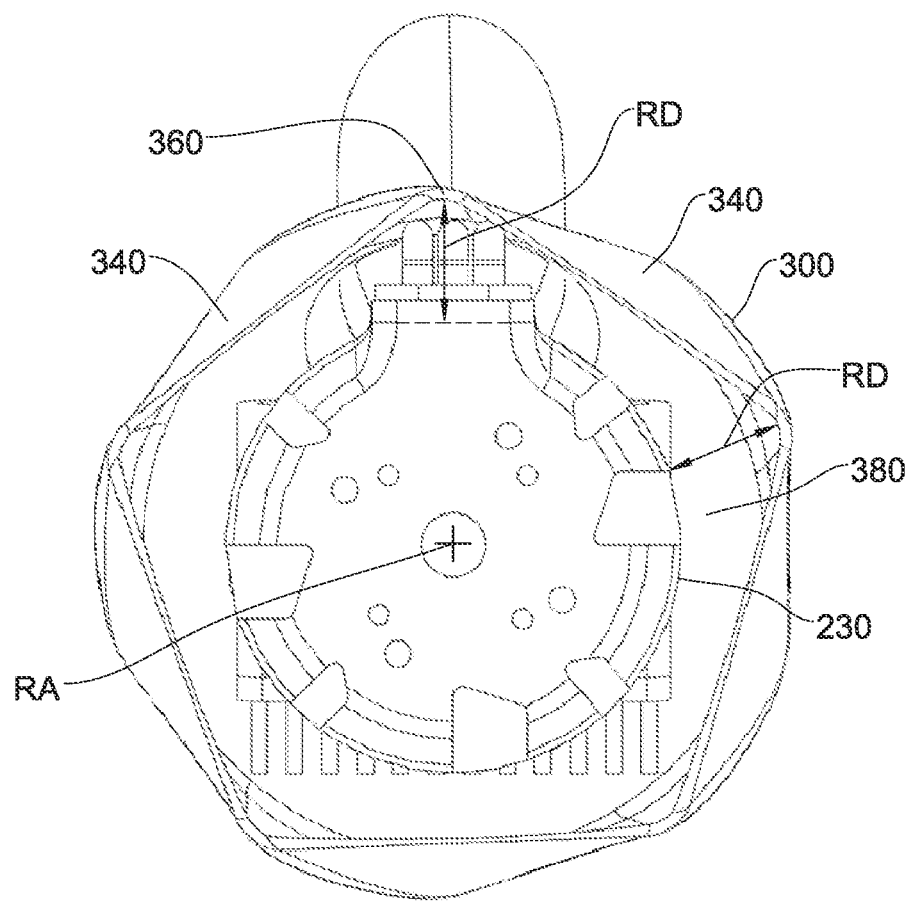
FIG. 21(a) is a front view of the nacelle of the example of FIG. 1, exposing an interior thereof.
Figure 21B:
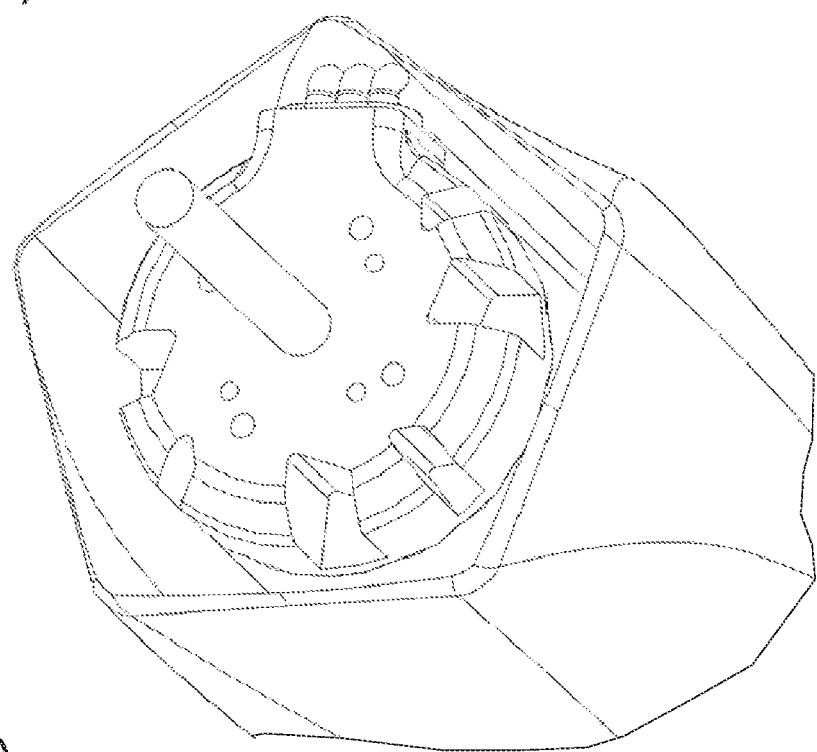
FIG. 21(b) is a front isometric view of the example of FIG. 21(a).

Referring also to FIGS. 21(*a*) and 21(*b*), it is to be noted that the profile of the channel 380 at least from station ST1 to station ST3 or to station ST4 non-uniform. The generally polynomial cross-sectional profile (in this example, the generally pentagonal cross-sectional profile) at each of the stations station ST1 to ST3 or to ST4, coupled with the general cylindrical cross-sectional profile of the drive unit 230 results in the cross-section of the channel 380 being radially deeper at some circumferential locations (corresponding to the locations of the respective transition elements 360, than in other parts corresponding to the facet elements 340. This in turn conveniently provides a maximum radial depth RD that can be used for channeling wiring 232 and/or other cables, tubes etc., from the drive unit 230 aft into the nacelle 300.

It is anticipated that if the same drive unit 230 were to be installed in a cylindrical nacelle, this would need to be of an overall diameter such as to provide a uniform channel of same maximum radial depth RD in order to accommodate therein the cables as well as maintain the rotor axis coaxial with the nacelle. Such a nacelle would thus be larger, heavier than the nacelle 300.

An alternative variation of the example of FIGS. 1 to 11 is illustrated in FIGS. 12(*a*), 12(*b*), 13 and 14.

The example of FIGS. 12(*a*), 12(*b*), 13 and 14 differs from the example of FIGS. 1 to 11 in that the respective first transverse width W1' of the facet transverse section FTS' (i.e., corresponding to the respective major facet section segment FST') remains nominally constant in an aft direction parallel to the rotor axis RA. This feature is illustrated in FIG. 11, in which the magnitude of the respective first transverse widths W1' remains nominally constant from longitudinal station ST1 to longitudinal station ST5, even though the blade chord BCH for the respective blade aerofoil sections BAS of the respective rotor blade 220 (when in the undeployed configuration UC) concurrently decreases from longitudinal station ST1 to longitudinal station ST5.

Concurrently, in at least the example illustrated in FIGS. 12(*a*), 12(*b*), 13 and 14, the respective second transverse width W2' of the respective transition transverse sections TTS' remains nominally constant from longitudinal station ST1 to longitudinal station ST5. Thereafter and up to the aft end of the nacelle 300, the transverse cross-sections become more and more circular.

Thus, in this example, the transverse cross-sections at each of the longitudinal stations ST1 to at least ST5 are generally polygonal (in this example pentagonal), with rounded corners corresponding to the respective transition transverse sections TTS'.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the scope of the presently disclosed subject matter as set out in the claims.

The invention claimed is:

1. A propulsion system, comprising:
a rotor arrangement; and
a nacelle,
the rotor arrangement being rotatably mounted with respect to the nacelle about a rotor axis:
the rotor arrangement including a plurality of rotor blades, each of the plurality of rotor blades being pivotably mounted to a hub element about a respective blade pivot axis, said plurality of rotor blades being deployable between an undeployed configuration and a deployed configuration;
the nacelle including a nacelle body having a nacelle outer surface, the nacelle outer surface including a plurality of facet elements and a plurality of transition elements, said facet element extending aft from the hub element, each adjacent pair of said plurality of facet elements being circumferentially spaced from one another by a corresponding said transition element, each of the plurality of facet elements having a first curvature with respect to said rotor axis, each of the plurality transition elements having a second curvature with respect to said rotor axis,
wherein said first curvature is different from said second curvature; and
wherein in said undeployed configuration, each said rotor blade is in overlying and fully external relationship with respect to a corresponding said facet element.

2. The propulsion system according to claim 1, wherein said first curvature is significantly less in magnitude than said second curvature.

3. The propulsion system according to claim 1, wherein said first curvature is non-circular with respect to said rotor axis.

4. The propulsion system according to claim 1, wherein said first curvature is conformal with respect to a portion of the pressure surface of a respective said rotor blade, said portion being defined between a forward and an aft contact point between the rotor blade and the facet element.

5. The propulsion system according to claim 1, wherein an orientation of a cross-section of each respective facet element of the plurality of facet elements varies along rotor axis corresponding to a variation of twist angle of the rotor blades.

6. The propulsion system according to claim 1, wherein said first curvature is non-concave.

7. The propulsion system according to claim 1, wherein said second curvature is circular with respect to said rotor axis.

8. The propulsion system according to claim 1, wherein said second curvature is non-flat with respect to said rotor axis.

9. The propulsion system according to claim 1, wherein said first curvature corresponds to a generally flat surface.

10. The propulsion system according to claim 1, wherein each of said plurality of transition elements is geometrically contoured to provide a smooth geometrical transition between adjacent said facet elements.

11. The propulsion system according to claim 1, wherein each of said plurality of transition elements is geometrically contoured to provide a non-discontinuous geometrical transition between adjacent facet elements of the plurality of facet elements.

12. The propulsion system according to claim 1, wherein in said undeployed configuration, each of said plurality of rotor blades is in a non-recessed relationship with respect to the respective said facet element.

13. The propulsion system according to claim 1, wherein said nacelle body is non-axisymmetric with respect to the rotor axis.

14. The propulsion system according to claim 1, wherein each said plurality of rotor blades includes a plurality of aerofoil sections extending between a respective blade root to a respective blade tip, each of said plurality of aerofoil sections including a respective aerofoil leading edge, a respective aerofoil trailing edge, a respective aerofoil chord, a respective aerofoil suction surface profile and a respective aerofoil pressure surface profile, and wherein for each of said plurality of aerofoil sections in the undeployed configuration, the respective said pressure surface profile is in abutting contact with or at a minimum proximity with respect to a corresponding facet transverse section of the respective said facet element at least at one of:
  a first matching point, corresponding to a respective forward aerofoil location and a corresponding respective first facet section location on said corresponding facet transverse section of the respective facet element; or
  a second matching point, corresponding to a respective aft aerofoil location and a corresponding respective second facet section location on said corresponding facet transverse section of the respective facet element.

15. The propulsion system according to claim 14, wherein in said undeployed configuration, the respective transition transverse section of each adjacent one of said plurality of transition elements of each respective facet element of the plurality of facet elements wholly lies on a first transverse side of a respective chord line that is co-aligned with the respective said aerofoil chord, wherein said first transverse side further includes at least a part of the respective pressure surface extending aft of the respective aerofoil leading edge.

16. The propulsion system according to claim 14, wherein in said undeployed configuration, at least the respective transition transverse section of each adjacent said transition element of each respective facet element of the plurality of facet elements wholly lies on a second transverse side of a respective first line parallel to a chord line and intersecting said first matching point, or wherein said respective first line is tangential to said first matching point, wherein said chord line is co-aligned with the respective said aerofoil chord, wherein said second transverse side is closer to the respective pressure surface of the respective aerofoil leading edge than the respective suction surface thereof.

17. The propulsion system according to claim 14, wherein in said undeployed configuration, at least the respective transition transverse section of each adjacent said transition element of each respective facet element of the plurality of facet elements wholly lies on a third transverse side of a respective second line intersecting said first matching point and said second matching point, wherein said third transverse side is closer to the respective pressure surface of the respective aerofoil leading edge than the respective suction surface thereof.

18. The propulsion system according to claim 14, wherein a respective rectilinear third line, joining a first point and a second point, wholly lies outside of any part of the respective aerofoil section corresponding to the facet transverse section, wherein said first point and said second point are non-identical, and wherein said first point and said second point are each defined anywhere on a forward part of the respective facet transverse section forward of the respective first matching point, or anywhere on an adjacent respective transition transverse section that is forward of, and joined to, said respective forward part.

19. The propulsion system according to claim 14, wherein a respective rectilinear fourth line, joining a third point and a fourth point, wholly lies outside of any part of the respective aerofoil section corresponding to the facet transverse section, wherein said third point and said fourth point are non-identical, and wherein said third point and said fourth point are each defined anywhere on the respective facet transverse section, or anywhere on an adjacent respective transition transverse section that is forward of, and joined to, said respective facet transverse section.

20. The propulsion system according to claim 14, including at least one of:
  wherein the forward aerofoil contact point is aft of the respective aerofoil leading edge by a first spacing, wherein said first spacing is in the range of zero to 35% of the respective aerofoil chord; or
  wherein the aft aerofoil contact point is forward of the respective aerofoil trailing edge by a second spacing, wherein said second spacing is in the range of zero to 35% of the respective aerofoil chord.

21. The propulsion system according to claim 14, wherein for each respective said facet transverse section, the respective first location and the respective second location define therebetween a respective facet section segment, wherein each said facet section segment has a non-circular facet segment curvature.

22. The propulsion system according to claim 1, wherein said plurality of facet elements have an equal number as said plurality of transition elements.

23. The propulsion system according to claim 1, including one of:
  wherein the propulsion system includes an equal number of said plurality of facet elements as said plurality of rotor blades; or
  wherein the propulsion system includes a first number of said plurality of facet elements and a second number of said plurality of rotor blades, wherein said first number is an integer multiple of said second number.

24. The propulsion system according to claim 1, wherein said plurality of facet elements include five facet elements and said plurality of rotor blades include five rotor blades.

25. The propulsion system according to claim 1, wherein a cross-sectional profile of the nacelle varies from a front end thereof to an aft end thereof, from a generally polygonal cross section with rounded corners to a general circular or other rounded cross-section.

26. The propulsion system according to claim 1, wherein a cross-sectional profile of the nacelle varies from a front end thereof to an aft end thereof, from a generally pentagonal cross section, with rounded corners to a general circular or other rounded cross-section.

27. The propulsion system according to claim 1, wherein a cross-sectional profile shape of the nacelle is relatively constant in an axial direction from a front end thereof to an axial location corresponding to an axial location of the blade tips of the rotor blades in undeployed configuration.

28. An air vehicle, comprising:
    at least one propulsion system as defined in claim 1.

29. A nacelle for a propulsion system having a rotor arrangement, in which the nacelle is configured for enabling the rotor arrangement to be rotatably mounted with respect to the nacelle about a rotor axis, and in which the rotor arrangement including a plurality of rotor blades pivotably mounted to a hub element about a blade pivot axis, said rotor blades being deployable between an undeployed configuration and a deployed configuration; the nacelle, comprising:
    a nacelle body having a nacelle outer surface, the nacelle outer surface including a plurality of facet elements and a plurality of transition elements, said plurality of facet elements extending aft from the hub element, each adjacent pair of said plurality of facet elements being circumferentially spaced from one another by a corresponding said transition element, each of the plurality of facet elements having a first curvature with respect to said rotor axis, each of the plurality of transition elements having a second curvature with respect to said rotor axis, wherein said first curvature is different from said second curvature; and
    wherein in said undeployed configuration, each of said plurality of rotor blades is in overlying and fully external relationship with respect to a corresponding one of said plurality of facet elements.

30. A propulsion system, comprising:
    a rotor arrangement; and
    a nacelle;
    the rotor arrangement being rotatably mounted with respect to the nacelle about a rotor axis:
        the rotor arrangement including a plurality of rotor blades, each of the plurality of rotor blades being pivotably mounted to a hub element about a respective blade pivot axis, said plurality of rotor blades being deployable between an undeployed configuration and a deployed configuration;
        the nacelle including a nacelle body having a nacelle outer surface, the nacelle outer surface including a plurality of facet elements and a plurality of transition elements, said facet element extending aft from the hub element, each adjacent pair of said plurality of facet elements being circumferentially spaced from one another by a corresponding said transition element of the plurality of transition elements, each of the plurality of facet elements having a first curvature with respect to said rotor axis, each of the plurality of transition elements having a second curvature with respect to said rotor axis,
    wherein the first curvature and the second curvature are flat; and
    wherein in said undeployed configuration, each said plurality of rotor blades is in overlying and fully external relationship with respect to a corresponding said facet element of the plurality of facet elements.

* * * * *